(12) United States Patent
Allen, III et al.

(10) Patent No.: US 11,952,735 B2
(45) Date of Patent: Apr. 9, 2024

(54) SUBTERRANEAN PLACEMENT OF LIGNOCELLULOSIC MATERIALS

(71) Applicants: Laurence E. Allen, III, San Rafael, CA (US); Laurence E. Allen, IV, San Rafael, CA (US)

(72) Inventors: Laurence E. Allen, III, San Rafael, CA (US); Laurence E. Allen, IV, San Rafael, CA (US)

( * ) Notice: Subject to any disclaimer, the term of this patent is extended or adjusted under 35 U.S.C. 154(b) by 54 days.

(21) Appl. No.: 17/672,553

(22) Filed: Feb. 15, 2022

(65) Prior Publication Data
US 2022/0169917 A1 Jun. 2, 2022

Related U.S. Application Data

(63) Continuation-in-part of application No. 17/176,192, filed on Feb. 16, 2021.

(60) Provisional application No. 62/976,689, filed on Feb. 14, 2020.

(51) Int. Cl.
*E02D 3/12* (2006.01)
*E02D 3/00* (2006.01)
*E02D 5/80* (2006.01)
*E21B 43/26* (2006.01)
*C09K 8/66* (2006.01)

(52) U.S. Cl.
CPC ............... *E02D 3/12* (2013.01); *E02D 3/00* (2013.01); *E02D 5/80* (2013.01); *C09K 8/665* (2013.01); *E21B 43/26* (2013.01)

(58) Field of Classification Search
CPC .... E02D 3/12; E02D 3/00; E02D 5/80; C09K 8/665; E21B 43/26
See application file for complete search history.

(56) References Cited

U.S. PATENT DOCUMENTS

| 4,422,948 A * | 12/1983 | Corley | C09K 8/032 |
| | | | 507/104 |
| 2023/0243240 A1* | 8/2023 | Murdoch | E21B 41/0064 |
| | | | 166/402 |

FOREIGN PATENT DOCUMENTS

AU 2011329769 A1 * 5/2013 ............. E21B 43/26

OTHER PUBLICATIONS

Germanovich Leonid N. and Murdoch Lawrence C. 2010 Injection of solids to lift coastal areasProc. R. Soc. A.4663225-3252 (Year : 2010).*

* cited by examiner

*Primary Examiner* — Janine M Kreck
(74) *Attorney, Agent, or Firm* — White-Welker & Welker, LLC; Matthew T. Welker, Esq.

(57) ABSTRACT

A method for altering a characteristic of the ground. The method comprises the steps of preparing a lignocellulosic material, suspending the lignocellulosic material in a slurry to create a lignocellulosic slurry, The method further includes the step of injecting the lignocellulosic slurry below the surface of the ground into a subterranean aperture. The method also comprises the placement of anchoring devices in the ground to alter at least one force experienced by the ground so that the shape of the subterranean aperture into which the solids are transported is altered.

7 Claims, 12 Drawing Sheets

Figure 10
A)
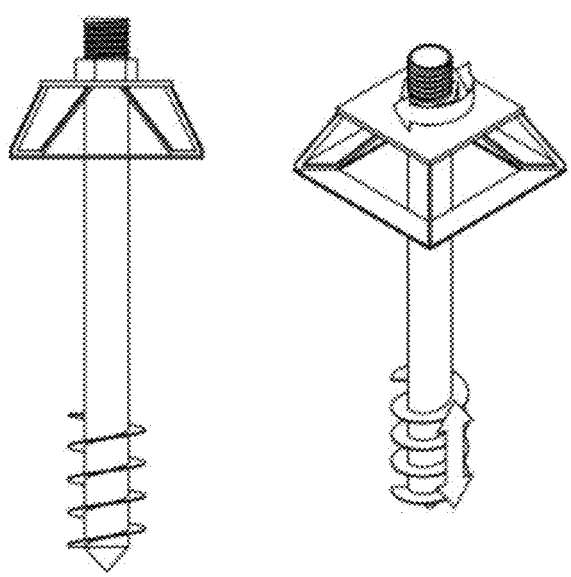
B)
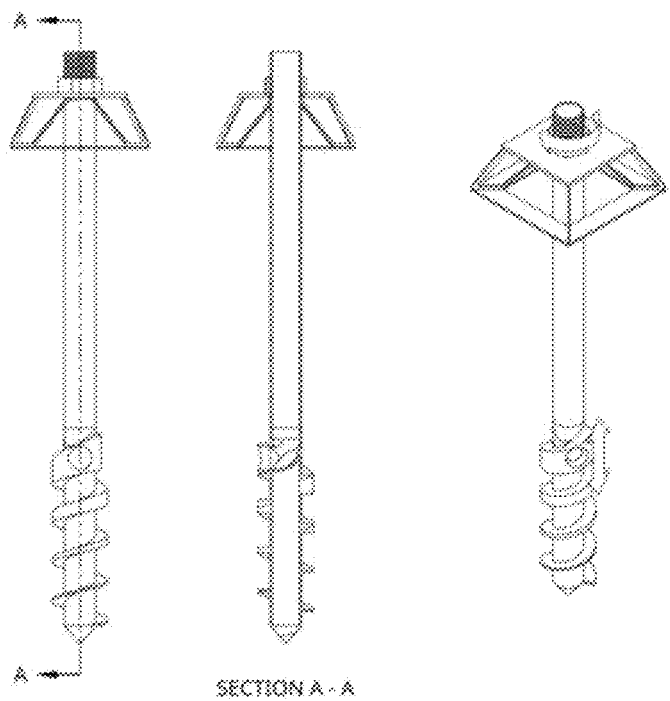
SECTION A-A

SUBTERRANEAN PLACEMENT OF LIGNOCELLULOSIC MATERIALS

TECHNICAL FIELD OF THE INVENTION

The present disclosure is generally related to a method and systems for elevating areas. More particularly, the present disclosure relates to systems and methods for the subterranean injection of solids that are of biological origin including divided wood, algae and plant material for example saw dust, wood chips, trimmings, leaves, and grasses.

BACKGROUND OF THE INVENTION

It is generally understood that sea levels will rise in conjunction with increased storm frequency and intensity as a result of elevated atmospheric CO2 levels. Certain coastal areas will face inundation by rising waters. There are few attractive options to protect coastal areas, though there are several understood techniques with varying levels of cost and protection. These techniques include building dikes to exclude seawater and allow pumps to drain sub-sea level areas of accumulated rain. This approach is used in a number of areas including the Netherlands and New Orleans. Other techniques include elevation of buildings and highways onto piers or surface fill.

A technique for injecting solid material below the surface of the ground (Germanovich, L. and Murdoch, L., (2010) Injection of Solids to Lift Coastal Areas. 466. Proc. R. Soc. A https://doi.org/10.1098/rspa.2010.0033) creates an option for elevating areas without substantial disturbance of existing constructions and infrastructure on the surface. This is an attractive alternative because it avoids construction costs associated with moving or elevating buildings or roadways onto piers or surface fill. It also is a permanent solution that does not require maintenance or create risks of catastrophic inundation that areas below sea or river level behind dikes must endure.

In the article the authors describe the solids to be used as "sediments" in an effort to show that they could be sourced from seabeds and rivers at low cost. (Clark, F. R., Bienn, H. C. and Willson, C. S. (2015). Assessing the Cost of Coastal Land Creation Using Dredged Material. The Water Institute of the Gulf. Funded by the Coastal Protection and Restoration Authority under the Science & Engineering Plan—Project Implementation Support Task. Baton Rouge, LA) provides an actual cost for sedimentary fill at $30/m3. This is approximately the value of quarried sand and gravel per m3 transported 50 miles or less in the US and provides a benchmark value.

An advantage of elevation of terrain and structures using subterranean injection of solids is that there is no disturbance of the actual use or characteristics of the existing structures when elevation or subterranean mechanical enhancement is done. Additionally, structures can be elevated a little at a time as needed once the rate of sea level rise is understood or more accurately predicted. This spreads the cost of protecting structures over potentially many years rather than requiring that the entire cost be borne at one time.

Additionally, no final commitment to a given level of elevation must be made in advance of good knowledge of required future elevation. A little elevation at a time with the option to repeat the process with more elevation in the future as needed is a better approach. If there is compaction, settling, subsidence or decomposition of some portion of solids, more may be slowly added later as compensation.

Definitions

Lignocellulosic material, when used herein, is a short-hand for any biomass material or lignocellulosic material and is understood to be plant material and explicitly includes up to 100% leaves, grass-trimmings, wood pulp, rice-husks, corn stover or any plant-based product including wood ash and biochar which have undergone reactive processing.

Pyrolysis is a form of reactive processing employing application of heat and, similar to combustion, may yield more carbon-rich solid materials such as carbon-containing ash or more concentrated carbon-containing materials sometimes known as biochar.

Lignocellulosic material is meant as a short-hand for all photosynthesizing organisms and so is intended to also include phytoplankton and algae though these organisms do not necessarily synthesize cellulose or lignin. In some islands or coastal areas, the most ready source of plant materials available for subterranean injection may be algae.

By the term "substantially" it is meant that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

The term "wood chips" is used as a shorthand for any comparable biomass based material with a fibrous nature.

The term "height" is occasionally used to describe the least of three dimensions of an aperture, for example. It is not meant to be restrictively be applied to altitude or dimension normal to the surface of the ground but rather is intended to indicate the smallest of three dimensions of a three dimensional shape. The height of a vertical aperture may thus project horizontal to the surface of the earth in this sense. The height is also meant to indicate the space between two surfaces. Because the surfaces will usually be somewhat curved, the height at one part of an aperture will point in one direction while the height at another part of the aperture with a different orientation will point in a different direction.

SUMMARY OF THE INVENTION

The present disclosure relates to an apparatus and process to protect structures and terrain from inundation as well as to gain potential improvements in seismic performance during earth tremors. Expansion of terrain or island formation is also enabled by the systems and methods disclosed herein. Aspects of the disclosed systems and methods include selection of depth, spacing and diameter of holes to be drilled. Other aspects of the disclosed system include selection, formulation, preparation, concentration and injection of lignocellulosic-based slurries into subterranean spaces. Measurement and adjustment of surface altitude, site monitoring and the techniques used to achieve desired final surface topography are also important aspects. The apparatus used to achieve these goals is an additional aspect of the present disclosure.

An objective of the present disclosure is to reduce the cost of elevating terrain, earthworks, structures of every description including roadways, bridges, buildings, and homes with little or no damage or cost of reconstruction. Terrain may be expanded, and new islands may be formed where previously no dry land existed. An additional object of the present disclosure is to gain additional valuable benefits relative to the use of mineral solids or sediments as described in Germanovich and Murdoch.

In addition to protecting structures and terrain the subterranean injection of lignocellulosic material may gain advantages such as the alteration of the mechanical character of the ground to improve seismic performance. Such injection may offer protection against hazards the lignocellulosic material might otherwise pose such as risk of fire or decomposition to release atmospheric pollutants such as methane, nitrous oxide, carbon dioxide or noxious odors. Lignocellulosic material may also be injected into a subterranean space to provide a space to accept fluid or gas.

According to an exemplary arrangement, a method for altering a characteristic of the ground comprises the steps of preparing a lignocellulosic material, suspending the lignocellulosic material in a slurry to create a lignocellulosic slurry, creating a fluid movement of the lignocellulosic slurry, resuspending a portion of the lignocellulosic slurry with the fluid movement, and injecting the lignocellulosic slurry below a surface of the ground.

In one arrangement, the lignocellulosic material comprises a buoyant force on the order of approximately +/−0.2 g/cc or less.

In one arrangement, the lignocellulosic material comprises an intrinsic particle density of approximately 0.8 to about 1.2 g/cc.

In one arrangement, the lignocellulosic material comprises a molecular density of approximately 1.45 to about 1.55 g/cc.

In one arrangement, the lignocellulosic material is selected from a group consisting of saw dust, divided wood, plant material, wood chips, wood pulp, rice husks, corn stover, wood ash, biochar, trimmings, leaves, grasses, grass trimmings, phytoplankton, algae, and biomass materials.

According to another exemplary arrangement, a method of subterranean injection of lignocellulosic material comprises the steps of selecting a suitable location for terrain protection, accomplishing surface elevation documentation, and placing surface elevation and inclination change sensors on a surface.

The method of the present invention further comprises the steps of determining a desired depth of prospective subterranean solids, determining a desired orientation of prospective subterranean solids, determining at least one subterranean injection location, and creating an injection well to enable a transfer of solids from the surface to the determined desired depth of the prospective subterranean solid.

The method of the present invention further comprises the steps of creating a subterranean aperture by injecting fluid under pressure into the subterranean space, and injecting lignocellulosic material into the aperture by injection of an aqueous slurry.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 10 illustrates in more detail soil anchoring mechanisms that can apply compression to the soil as well as inject fluid into an area of the soil above the lower anchor.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus and method of the present invention.

The present disclosure provides techniques and apparatus to enable the protection of terrain and structures from inundation by ground level elevation as well as to protect structures from seismic events by altering the mechanical character of the ground. Terrain may be expanded, and islands may be formed if the process is used in shallow marine areas. Additionally, benefits are accrued by the use of the invention by avoiding hazards due to fires and pollution which would result if the invention were not implemented.

These disclosed methods and systems will enable leveling of structures in cases where past differential settling has damaged them. The disclosed systems and methods are excellent ways to achieve long-term sequestration of carbon to reduce atmospheric accumulation of carbon dioxide.

Figure 1:
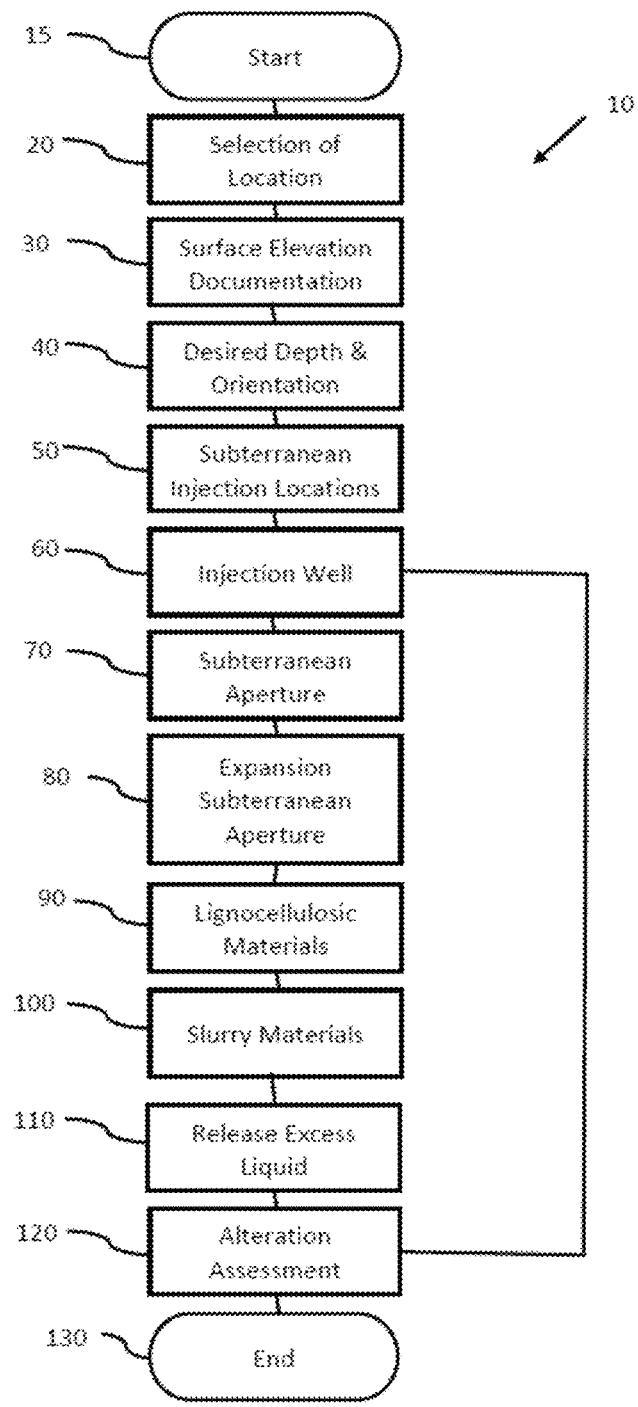
FIG. 1 illustrates a method for the protection of structures with subterranean injection of lignocellulosic solids.

In one arrangement, the present disclosure comprises in one aspect a method 10 of protecting structures with subterranean injection, including a sequence of steps as illustrated in FIG. 1. According to this method 10, the process starts at step 15 and proceeds to a first step 20 wherein selection of a suitable location is done where the advantages of structural or terrain protection from inundation or seismic events or both may be advantageous.

The process then proceeds to step 30 where surface elevation documentation is next accomplished in conjunction with the placement of surface elevation and inclination change sensors.

After step 30, the process proceeds to step 40 where a determination of the desired depth and orientation of prospective subterranean solids is done by evaluation of soil borings or other information about local geotechnical character of the site.

Then, the process proceeds to step 50 where a determination of the number of subterranean injection locations is done which will best accomplish the elevation of ground and contouring of surface or alteration of local soil mechanical properties as desired.

After step 50, the process proceeds to step 60 where a creation of an injection well is done which will enable transfer of solids from the surface to the selected subterranean depth. In one arrangement, this will entail drilling, direct piercing, sonic drilling, or auguring to the appropriate depth. Placement of pipe or tubing from the surface to the bottom follows if not used in the process of creating the well. The well bore may then be sealed to the pipe or tubing so as to ensure that fluids pumped into the injection well cannot simply flow back to the surface or other substrata around the pipe or tubing via the well bore. This sealing may often be accomplished through the use of cementitious sealing plugs, polymer foams, reactive grouts or inflatable plugs that isolate the fluid and pressure at the base of the hole from that of the well bore. Placement of equipment to monitor the subterranean conditions such as a pressure transducer may also be done as needed. Connection of the well to the fluid preparation, pressurization, movement, monitoring and control systems is done.

Next, at step 70, creation of a subterranean aperture is accomplished by injection of fluid under pressure into the subterranean space. This step may involve the use of high-pressure jets to help direct the shape of formation of the aperture or additives to increase the fluid viscosity and reduce aperture leak off of injection fluid.

At step 80, expansion of the subterranean aperture is next accomplished by the injection of fluid under pressure.

At step 90, placement of lignocellulosic materials in the aperture is completed with the injection of an aqueous slurry.

Then, at step 100, rinse of slurry materials from transfer piping with the aqueous solution is done as needed.

And then at step 110, release of excess liquid from the aperture is next allowed which is called relaxation. This may be done by allowing fluid to leak out into adjacent subterranean structures or the fluid may be removed at the surface by release of pressure or by controlled pumping. The aperture surface settles over the included solid fill and can compact the subterranean solid fill. This relaxation allows the included solids to bear the weight of the overburdening earth rather than for the fluid surrounding the solids to bear this weight. With time subterranean fill will also become more thoroughly saturated with fluid increasing the density of individual fill particles and potentially causing them to swell.

And finally, at step 120, assessment is completed of alterations in surface elevation and inclination changes. The process concludes at step 130.

As illustrated, process steps 60-120 may be repeated any number of times to elevate and shape the terrain. Larger areas may require that a large number of wells be created and any given well may undergo injection, material distribution, and relaxation cycles multiple times.

The aqueous slurry injected in the lignocellulosic placement at step 90 is created and controlled on a separate apparatus which is further described. In order to illustrate the best mechanism and implementation of this slurry preparation apparatus it is illustrative to describe the objectives and advantages of the use of lignocellulosic material for subterranean slurry injection. Once again, lignocellulosic material is understood to include lignocellulosic materials of all descriptions with or without reactive processing which originated from plants or other photosynthetic organisms as stated earlier.

An object of the present disclosure is to describe systems and methods to reduce the cost for protection of structures and terrain from inundation. This cost reduction derives from a number of different improved aspects of the disclosed systems and methods relative to the use of mineral solids or sediments to elevate terrain and structures as described in Germanovich and Murdoch. These improved aspects include at least the following: Transportation cost of solids to be injected is significantly reduced, Slurry preparation costs are reduced, Slurry injection management and subterranean distribution of solids is simplified, and Certain costs associated with location surface preparation and post-injection clean-up are eliminated.

More details on achieving by the presently disclosed systems and methods of each of these cost reduction advantages and their importance follows.

If it is, for example, desired to elevate a hectare of terrain or structure by 1 meter of altitude, the minimum requisite volume of solids exceeds 1 meter×10,000 m$^2$=10,000 m$^3$. The minimum requisite volume of solids exceeds this number because the edges of the elevated area must be tapered down to meet the old surface of the earth. The taper volume requires additional solids with the quantity dependent on the slope of the taper. For very large areas of elevation the volume of solids required approaches this minimum volume per area due to the diminishing significance of this edge effect. The minimum volume also exceeds this minimum value because a given volume of solids when measured as delivered to the surface location will compact and densify after placement in a subterranean space and exposure to compaction forces such as the mass of the soil overburden the solids will support.

Exposure to water will also have various densifying effects with time. The cost of some solids including wood chips and dredge spoils may often be very low or even less than zero. This would mean that the solid was removed from one location for a different purpose than direct sale as is often the case with solids removed to deepen a navigational channel or trees removed for landscaping or fire suppression purposes. The delivered cost associated with a new location where the solids are desired is largely determined by the cost of transporting the solids from the site of removal to the locations where the solids are desired. This cost is most frequently defined for bulk materials by density.

The bulk density of chipped lignocellulosic plant materials is variable but frequently in the range of 0.15 to 0.35 g/cc while mineral solids such as sand and sediment are frequently in the bulk density range of 1.5 to 2.0 g/cc. The bulk density includes the open space between particles and perhaps the water that may fill them and so is lower than the particulate or intrinsic density.

A truck or other transportation device is usually allowed a certain maximum mass to transport and thus the volume transportable at this maximum mass may be expected to be inversely proportional to the densities of the materials. It is expected that the delivered price of lignocellulosic materials will range from one tenth to one quarter the cost of sand, soil or sediment because a comparable volume of the mineral materials would require four to ten times as many truck trips to transport.

By converting the bulk densities of lignocellulosic material and also sediment to volumetric ranges delivered per truck shipment the lower transportation cost advantage of lignocellulosic material becomes apparent.

For a truck able to carry 20,000 kg, 57-133 m3 of lignocellulosic material versus 10-13 m3 of mineral materials may be brought with each truck. To elevate each hectare of terrain and structures by 1 meter exclusive of edge taper effects and compaction consideration would therefore require perhaps 75-175 truckloads of wood chips as opposed to perhaps 800-1000 truckloads of sediment, sand or other mineral material.

Information from The California Department of Transportation is useful in order to gain perspective on the importance of reducing costs associated with mineral fill required to protect structures from inundation. Caltrans estimates that 3,000 lane miles in California will ultimately require protection and assuming 10 m total lane width at 1 m elevation and $40/m3 for purchase, preparation and delivery of fill a cost of nearly $2 billion would be incurred and require nearly 4 million truck trips. For comparison, total funding for the State Transportation and Improvement Program is about $3 billion annually. Fill cost would be only a fraction of project cost and highways are a small fraction of terrain and structures that require protection in California. Sea level rise has been called the largest engineering problem mankind will face.

A low-cost mineral fill material, for example the dredge spoils and sediment referenced by Germanovich and Murdoch would contain unwanted coarse and problematic materials, for example large rocks, metal cans, rope and branches as may have accumulated at the bottom of navigational channels or elsewhere. When dredge spoils are pumped, very large centrifugal slurry pumps are needed to pass the majority of these large contaminants. The large foreign materials would require removal before subterranean injection. This removal could be done in either a dilute aqueous vibratory screening operation or in stagewise cyclonic or gravity settling equipment.

In each of these cases, a large quantity of contaminated water would be produced which would require a large settling pond. This type of operation is problematic in many areas because dredge spoils often contain hazardous chemicals such as heavy metals and often must be tested for such. Once processed in a dilute slurry, in order to remove the bulk of the spoils, it is likely that a slurry of very fine and therefore very slow to settle clay-like particles would be produced. This clay slurry would likely contain still a higher level of these hazardous contaminants. This potentially hazardous clay slurry would likely require significant processing to render suitable for disposal.

An alternative would be to allow all the dredge spoils to dry and then process them with a regrinding and dry screening operation. This drying would require a great deal of time and land area. Either wet or dry processing of dredge spoils to remove oversize materials is necessary to create a manageable material for concentrated injection into narrow subterranean apertures. This additional processing may add substantially to the $30/m3 cost figure referenced earlier which applied only to surface dumping of spoils.

Surface sourced mineral materials for injection would also require screening to eliminate oversized inclusions. Only surface sourced materials that could form thick pumpable mud would be suitable for subterranean injection. Some soil and sediment contain some quantity of partially decomposed organic matter but this is an insignificant fraction in many cases.

Lignocellulosic fill materials are an extremely attractive alternative to mineral fill. A significant advantage of the subterranean injection of lignocellulosic material as described herein is that they have high porosity and lower density while in some cases retaining high mechanical strengths. The porosity enables these alternative solids to form slurries that do not settle as rapidly as mineral solids of comparable dimension. Sand and other dense mineral materials often have particulate (intrinsic) solid density of about 2.7 g/cc and thus settle readily in water at a rate determined by their particle size and the viscosity of the water within which they are suspended. Biological origin solids may float in water, be neutrally buoyant or sink based on porosity of their structure and the degree of water saturation of these air-filled pores.

Most wood materials and similarly porous biological materials may have a pressure dependent buoyancy in fluid. Increased pressure will progressively collapse included air space and shift these materials toward higher apparent densities as they approach their molecular density. The molecular density eliminates porosity effects. The molecular density of lignocellulosic materials is approximately 1.45-1.55 g/cc dependent on the ratio of lignin to holocellulose. Thus, they may sink or float in an aqueous media depending on wetting and the volume of the included vapor space.

Lignocellulosic material may alternatively be made to sink, or float based on pressure, duration of exposure to the liquid, and agitation. Lignocellulosic materials that have undergone reactive processing vary in their densities and porosity depending on the conditions of the reactive process.

Lignocellulosic materials inevitably contain some fraction of sand, soil and other mineral material as incidental contamination. Some lignocellulosic materials such as algae gathered in coastal areas will often contain contaminants such as plastic and other foreign materials. In many cases, these inclusions do not change their fundamental character and suitability for subterranean injection. In fact, the inclusions may make it desirable to use the contaminated materials for subterranean injection rather than other potential uses such as surface soil enhancement.

Improved slurry management tools can be important when seeking to inject slurries with larger particle sizes. Fine particles sizes, for example, 20 micrometer diameters, are necessary with particles that have intrinsic densities of 2.6-2.8 g/cc or higher and thus have a negative buoyant force proportional to particle density–fluid density (=1.7 g/cc in the case of sand and water) in water. Biological sourced materials have buoyant forces in water that may be either positive or negative and generally of a magnitude less than 25% as large as most mineral materials of comparable size. Often these buoyant forces are instead about +/−0.2 g/cc or less depending on the relative quantity of included gas in the plant cell structure. This low buoyancy or sinking force enables slurries to be stable with particles that are dramatically larger.

It is important to note that there will be near-neutrally buoyant particles as long as the pressure is below a critical high mark which would result in all wood or plant chips below a finite size sinking. In an effort to understand this phenomenon a pressure of 827.4 kPa was applied to a slurry of fir bark fines screened to pass a #4 mesh square hole screen. 827.4 kPa resulted in 95% of chips sinking but was insufficient to render approximately 5% of chips negatively buoyant and they remained floating in the water at 25° C. 827.4 kPa (120 psi) is approximately the pressure that would be encountered at a depth of 120 ft below ground surface near the sea. Larger wood/plant chips might have sealed air cavities that do not fill with fluid immediately but may ultimately saturate if included gas can dissolve in fluid or if fluid can displace the gas toward the space between individual chips.

A slurry of lignocellulosic materials or biologically sourced material (collectively called lignocellulosic material but understood to also include 0-100% leaves, grass, or any other plant material, also called "biomass") performs very differently in a water slurry in comparison to mineral slurries that commonly have intrinsic particle densities of approximately 2.7 g/cc. Wood chip slurries do not consolidate and solidify after settling in the way that mineral or rock/soil materials are observed to do. As an example, a mixture of minus 60 mesh sand with 20% clay soil from Marin County California after settling in a 200 ml glass jar cannot be completely resuspended with vigorous shaking unless the jar is inverted numerous times. The solid mixture settles with larger particles at the bottom and progressively finer material toward the upper portion of the settled mass.

In another trial a slurry of fine particles (8-20 micron) magnetite is observed to form a solid-like plate and cannot be resuspended without recrushing and intense shearing. This behavior may be characterized as partial cementation. Still another example of a mineral slurry is a minus 40 mesh clinoptilolite zeolite which also compacts after settling and partially cements. Hard physical scraping and agitation is enough to partially resuspend this material.

Without the addition of thickening clay fines to counteract this settling, additives which increase the viscosity must often be used. Common additives for hydraulic fracturing slurries used to deliver mineral proppants into petroleum well geological structures include polyacrylamide and polysaccharides such as guar gum. The particle size of the proppants must be small and the viscosity of the fluid sufficient to enable transport of the proppant horizontally into the fracture without proppant settling or screening out.

When lignocellulosic material is submerged in water or brine it saturates over a period of time with water, the rate of saturation with water is initially more rapid but slows after a number of hours and near-complete saturation may take years. Even after years in a fully saturated earth environment, some portion of the gas contained in the interstices of plant structure may persist. The mobility of the water phase surrounding the chips is expected to control the rate of removal of residual gas from the wood. If the water phase is immobile, it may be that the original air is retained. Additives such as guar gum, xanthan gum or fine particle size clay minerals that increase the fluid viscosity may reduce the rate that gases can migrate through the fluid by reducing convective currents and by immobilizing gas bubbles so that they may not freely move in the fluid.

When lignocellulosic materials are injected beneath the soil surface, an important eventual consideration is decomposition. Reduction or cessation of decomposition may often be desired. Maintenance of an oxygen-free or anoxic environment is crucial to avoid aerobic microbial decomposition. Depth beneath the soil surface is an important consideration to ensure an anaerobic or anoxic space for wood placement. In many areas with clay soils a meter below ground surface is more than adequate to reach a permanently anaerobic region. In more porous sand or loam soils air penetrates farther. or Exclusion of fixed nitrogen in the form of ammonium ion, amines, nitrates, high nitrogen content plant material and other available forms for microbes is important in pursuit of reduced decomposition. Exclusion of phosphorus is additionally important.

It is also possible to affect decomposition by manipulating the pH of the wood chip environment or by adding inhibitors or biocides. Another mode to reduce decomposition would be to enrich the environment with the products of decomposition whether those products are organic acids, $CO_2$, methane or other constituents. Some decomposition of wood chips is inevitable, and this may result in the presence of vapor bubbles in the subterranean space from accumulation of $CO_2$ and methane to accompany any residual nitrogen or other constituents of residual air. If decomposition reaction products are retained in the wood environment and not allowed to exit, the degradation rate must ultimately decline. Saturation with reaction products such as hydrogen sulfide gas in the case of near-anaerobic decomposition by sulfur utilizing microorganisms can ultimately stop degradation and poison microorganisms responsible for decay.

An example of reaction rate decline due to the buildup of reaction products is fermentation of sugar-containing fluids by yeast. Elevation of alcohol content in wine or beer will ultimately stop further biological decomposition of sugars to alcohol. Limiting availability of necessary reactants or nutrients and buildup of reaction products will both limit decomposition of lignocellulosic materials in a subterranean environment.

The solubility of gases such as oxygen, carbon dioxide, and methane in the aqueous fluid surrounding submerged lignocellulosic particles is an important determinant of decomposition reaction rate. The quantity of reducible reactants such as oxygen for aerobic decomposition or sulfate, iron, manganese and nitrate ion for partially anoxic decomposition determines whether the whole lignocellulosic material can be decomposed and to a large extent how rapidly that decomposition will occur.

In a fully anoxic environment, the lignin component of lignocellulosic materials does not degrade and the rate of decomposition of holocellulose which is the combination of the carbohydrates cellulose and hemicellulose that makes up cell walls in plant material is greatly reduced. Anoxic decomposition of carbohydrates involves methanogens consuming low molecular weight acidic molecules that are produced by other microbes. Anoxic decomposition produces a mixture of carbon dioxide and methane gas. If the reaction products are allowed to accumulate the reaction may be slowed or stopped, as mentioned earlier. In a subterranean environment the condition is effectively always anoxic below the water table or more than a meter underground if dense soils are present.

Coastal or riparian areas subject to inundation are often anaerobic due to close proximity to the subterranean water table. Lignocellulosic materials pumped into a subterranean space of adequate depth or below the local water table are generally only subject to anaerobic decay assisted by methanogenic microbes once initial oxygen available in pore spaces are consumed. This anaerobic decay can only proceed to the extent that reaction products (wastes) can exit the subterranean space. Carbon dioxide and methane can migrate as gases through subterranean spaces. Gases such as oxygen, methane and carbon dioxide are significantly less soluble in water when sodium chloride and other salts are present. Because of this brackish water like sea water can slow delivery of reactants and removal of wastes for microbes decomposing lignocellulosic materials and thus increase the longevity of these materials in a subterranean space.

The determination of a minimum depth of injection to ensure that wood chip materials will persist in the subterranean environment guides depth selection. The wood chips must be injected below the permanent anaerobic surface level or horizon of the soil. The elevation below ground surface of the transition to anaerobic and anoxic conditions will be different for each soil type and geographic region. The anaerobic depth varies with local water table depth, soil compaction and soil type.

The anaerobic depth will be the lessor of: 1) The local water table as determined by soil cores or one skilled in local hydrology, 2) 1 meter below an area of soil with 20% or less void space as determined by soil cores, 3) The depth at which redox testing of soil chemistry performed using direct measurement by one skilled in the art shows a reducing condition, and 4) 5 m deep if the soil is fine grained such as silt or clay.

As further explanation soil with 20% void space or less is too compacted to allow air passage and so can stop air penetration to zones below. The presence of iron as Fe(II) as opposed to Fe(III) indicates a reducing soil environment and can signal to one skilled in the art that soil at and below that depth will be anaerobic. Direct measurement of the redox potential of the soil to indicate a reducing environment is an alternative method to signal an anoxic state because of anaerobic conditions or consumption of nearly all available oxygen by soil components.

This anaerobic depth may be considered a minimum distance below ground level needed to avoid wood chip decomposition by aerobic microorganisms but soil stability for structures may require injection still deeper as further defined below. The desired level of wood chip compaction by the overburdening soil will establish a deeper minimum depth for material placement if structures are to be supported by the injected lignocellulosic material. The indicated injection depth would therefore need to be below the anaerobic transition horizon and also the minimum depth to achieve adequate compaction. The physical properties of fibric peat soil including its friction angle and shear strength increase with increasing consolidation pressure. This is true with other varieties of organic fibrous materials.

At a depth of 5 m the consolidation pressure would be about 100 kPa and the shear strength and friction angle of a compressible wood chip layer would often be on a par with or in excess of the shear strength and friction angle of clay or silt soils. At this or greater depth clay soil types would be reinforced by a layer of wood chips. Biomass materials come in a very broad variety of characteristics and selection of a fibrous material with particle size in the range of 2 mm to 25 mm would best serve this reinforcement character. Deeper injection than the minimum depth determined above is economically advantageous if fewer well bores are desired and a greater injection quantity per well is sought. Geotechnical engineers must be consulted to determine depth required beneath any structure with more than two stories.

An injection depth of 5 m is a practical minimum and 100 meters is considered a practical maximum depth of injection.

Saturated wood chips are highly porous and subject to significant compaction as the depth of the overburden increases and thus normal stress state of the woodchip soil increases. Fully saturated wood chips will undergo some additional compaction due to creep and thus the level of porosity and hydraulic conductivity will decline over time until a steady state is reached. The level of creep consolidation will increase with increasing depth due to higher loads from the overburdening soils.

Lignocellulosic material when placed in water often has sequestered vapor (mostly air) held inside residual plant structure that can gradually escape. The process of this gas escaping from plant tissue may be through physical replacement by water. This pushes vapor bubbles out. Another form of escape is through dissolution in the fluid. Oxygen is approximately twice as soluble in water as is nitrogen and air contains only approximately 21% oxygen gas but 78% nitrogen. Available oxygen will be consumed by aerobic lignocellulosic decay organisms. It is thus expected that the vapor bubbles inside the wood structure will more rapidly be depleted of oxygen than they are depleted of nitrogen.

Initially fresh lignocellulosic materials are quite easy to suspend in water or brackish water as they become wet and take up moisture. Smaller sized chips tend to saturate with water faster and often sink within a short period. Lignocellulosic slurries are dramatically simpler to resuspend after settling in comparison to mineral slurries. A portion of the slurry resuspends instantly with fluid movement because its buoyancy is nearly neutral.

Larger lignocellulosic particles will resist decomposition longer and thus it is desirable to pump larger Lignocellulosic particles into subterranean spaces. Green waste and wood chipping operations create a range of particle sizes. Uniformly fine lignocellulosic materials such as sawdust of perhaps 2 mm length by 1 mm width can be quite easy to suspend in an aqueous slurry. Sawdust requires more energy to produce and thus once limited supplies of "waste" sawdust materials are exhausted, sawdust would be a much more expensive form of lignocellulosic materials for slurries than coarse chips. Sawdust sized material also has a lower bulk density than coarser materials which in turn means a given mass of sawdust will require more water to slurry than a comparable mass of coarser lignocellulosic material. Sawdust is also more compressible than more coarsely sized lignocellulosic materials such as bulk wood chips produced by tree trimming services.

A 100 mm thick aperture filled with a sawdust slurry might thus need to lose much water during the relaxation stage mentioned in the sequence of steps for injection to place materials in a subterranean aperture. This relaxation step allows the injected solids to begin to support the full weight of the overburdening earth. The quantity of water lost from the aperture during relaxation by a wood chip slurry with average particle size of 20 mm might be half that lost in a similar relaxation conducted on a sawdust slurry of average particle size 2 mm if both slurries were formed with a similar dry volume of sawdust and woodchips.

The ability to slurry and inject large particles of lignocellulosic materials has the advantages of significantly lower size-reduction costs, slower degradation in a subterranean environment, lower water required to form slurries, and consequently lower water loss requirement during relaxation of the filled subterranean aperture space. The near-neutral buoyancy of lignocellulosic materials is advantageous in this regard. It is expected that particles up to or indeed in excess of 25 mm in any dimension may be pumpable with appropriate pump systems such as progressive cavity or piston pumps that include large check valves. Well piping diameter must be at least four times the diameter of the largest particles.

Subterranean apertures may be of any orientation, vertical, inclined, horizontal or any complex intermediate shape. Horizontal apertures when filled serve most effectively to elevate the surface of the ground. Slurry flow in a horizontal space poses important challenges. As the fluid flows in a horizontal direction, solids denser than the fluid (which usually has a density close to that of water) will sink until they reach the floor of the aperture. To reduce the rate at which solids settle the viscosity of the fluid may be increased or the size of the solids may be reduced. As the viscosity of the suspending fluid increases, the requisite difference in pressure between the starting point of the fluid and its ultimate endpoint along a horizontal plane increases. Pumping more viscous fluids requires more energy than less viscous fluids over a similar path. A more viscous slurry will prevent solids from settling and also from excessive contact friction with edges of solids such as encountered in sharp pipe bends or tight underground spaces.

When solids contact edges in an inadequately viscous fluid they are more easily stopped and can "screen out" or form a packed bed at the edge or transitional space. Additives such as guar or xanthan gum or mixtures of the two as well as fine clay materials like sodium bentonite clay can increase the viscosity of fluid and help avoid screen outs or immobilization of solids at tight transitions or bends.

A mineral solid slurry must be maintained at an adequate agitation velocity or the solids will settle unless the solids content is high enough to result in a thick paste or mud. There are important problems caused by either a thin and easily pumpable mineral slurry or a thick and slow settling slurry both above and below ground. The thin slurry will fill the subterranean aperture with a large volume of water which will still contain fine clay particles and be quite dirty in appearance and potentially able to pollute surface water. Though the thin slurry is quite pumpable it will not carry adequate solids to prop up the terrain and the extra water will require a long period to escape the aperture. Relaxing the aperture so that the solids are bearing the weight of the overburden may take a long time. Reuse of a given aperture space may be challenging because the fine clay particle may clog the pores of the space around the solids as the additional water attempts to exit during relaxation. Therefore, relaxation may take progressively longer and eventually the aperture may not function for additional injections.

The thick mud will result in a high pressure differential between the injection point and the peripheral extent of the aperture. This pressure differential results from the Bingham plastic rheological nature of the mud and may distort the shape of the aperture. The distorted shape may result in the central or material entry portion of the aperture filling with a disproportionate quantity of the solids while the periphery has much less material. A thick mud is also potentially a major contamination issue for the surface area around the well in the inevitable event of a spill.

Lignocellulosic slurries by comparison are quite easy to sort, manage and use in a subterranean injection operation. They may be preselected to include only particles of a certain size range with trommels or vibratory screeners without need for drying or fines management systems. Lignocellulosic materials are not generally considered problematic or contamination when spills occur on the surface. They may often be removed with rakes, brooms, leaf blowers, or vacuums. They may also be intentionally placed on the surface to act as a weed controlling mulch or landscaping material. When structures are elevated, the surface placement of residual lignocellulosic mulches, for example wood and bark mixes, creates a particularly beneficial habitat for methanotrophic bacteria. Therefore, the placement of mulch on the surface of an elevated area may be considered an important part of the process of ensuring that little or no methane escapes to the atmosphere. It is during the first few years after placement of the subterranean fill when whatever anaerobic evolution of methane from the subterranean space is highest. Methane produced by anaerobic organisms is generally understood to peak shortly after placement and decay thereafter in the ensuing few years.

The water used to produce a lignocellulosic slurry does not generally become contaminated as water that is used to make a mud or mineral slurry is observed to become filled with fine muddy clay particles. If freshwater is used for slurry formation, there is generally no contamination issue on the surface in the case of slurry water spills and therefore no reason to expend effort avoiding surface water spills. Mineral slurry systems would require surface protection systems to trap the water and recover and potentially haul it away after use. This activity adds substantially to the cost of using the mineral slurry for terrain elevation. No such cost is associated with the use of a lignocellulosic slurry except perhaps in unusual cases.

It is expected that local river water, seawater or brackish water will be used for slurry production in many areas when terrain is elevated immediately adjacent to such waterways. If this can be done it can significantly reduce costs when treated freshwater is more valuable. The fact that lignocellulosic slurries do not add significant contamination to waterways enables this procedure.

As noted previously, FIG. 1 illustrates a method 10 of Protecting Structures with Subterranean Injection of Lignocellulosic Solids.

Figure 2:
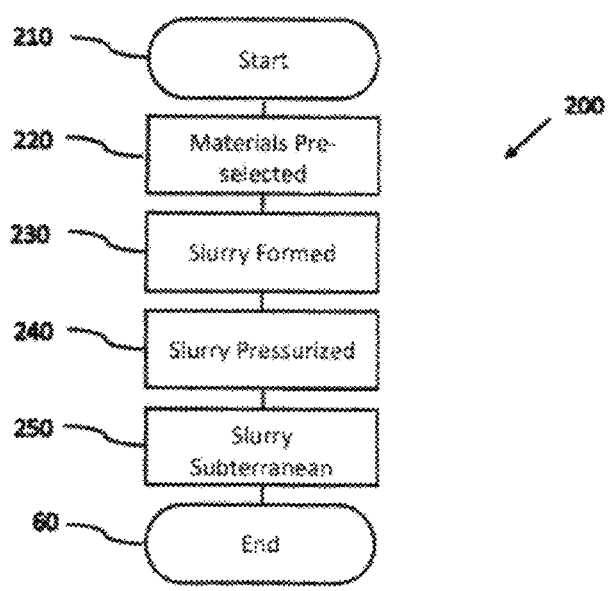
FIG. 2 illustrates a method of pre-selecting lignocellulosic materials for injection.

Placement of a subterranean slurry as described in step 90 of the general procedure steps enumerated earlier may now be more fully described in a detailed sequence of steps. For example, returning to FIG. 1 and the process 10 illustrated therein, at step 90, placement of lignocellulosic materials in the aperture is completed with the injection of an aqueous slurry. FIG. 2 illustrates a method for preparing lignocellulosic materials. As illustrated, the process starts at step 200 and proceeds to step 210, where the materials are preselected to include the variety or varieties of lignocellulosic materials that are most desirable and those other constituents of the slurry to be formed subsequently.

Then, at step 220, the slurry is formed, an optional post-selection process may be utilized and the slurry is brought to the desired solids level.

Then at step 230, the slurry is pressurized.

Then, at step 250, the slurry components are methodically placed in a subterranean space using a sequence of steps which best enables construction of the subterranean solids mass that is most suitable.

Each of these steps will be described further to add detail and understanding. For example, the pre-selection process at step 220 is guided by knowledge of how different materials contribute to the slurry formation and subsequent solids placement using the slurry. Lignocellulosic materials may be selected based on species of plant material, size or shape of plant material, porosity of plant material, degree of water saturation, or degree of decomposition. Additional slurry components such as finely divided mineral solids, chemicals, binding agents and viscosity adjustment agents such as guar gum, cross-linkers and breakers, which are used in hydraulic fracturing, may also be beneficial in the slurry or may be desired in the ultimate solid mass to be placed in a subterranean location.

An important selection criterion is fiber length. Peat soils are notoriously poor at supporting structures. Peat is a decomposed form of lignocellulosic material, Fibric peat soils are less decomposed and contain fibers that serve to enhance their shear strength. The normal force applied to the sample compacts the fibric peat and its shear strength as measured by the direct shear test also rises. At or near the surface where there is little compaction pressure the shear strength of peat soils is very low and so these soils are problematic for structure foundations. However, at depths of 5 meters the compaction pressure arising from support of the overburdening soil would make the soil shear strength adequate for fibric peats in some circumstances. Less aged lignocellulosic materials would be expected to follow a similar pattern. More fibrous materials may be desirable at shallow depths and less fibrous materials may be selected for deeper injections.

The aspect ratio or length to width ratio for fibrous lignocellulosic materials significantly affects their strength. Short fibers do not impart as much strength as do long fibers in wood fiberboard products. The strength of wood also varies dramatically with and against the grain of the wood.

The portion of the holocellulose component of lignocellulose may eventually decompose in an anaerobic environment but lignin is generally persistent. Most lignocellulosic biomass will remain even after many thousands of years. The ratio of lignin to holocellulose varies by type of lignocellulosic material as it does with algae and phytoplankton. Most algae for example have little to no lignin and some may have no cellulose.

In certain situations where terrain or a structure is to be elevated, it may be desirable to reduce the potential settling due to decomposition or the possible evolution of methane and carbon dioxide from anaerobic decomposition. In these cases, high lignin species may be desirable or even very high lignin components of a given species. Pine tree bark has nearly double the lignin content of pine wood in many cases. Coconut husks and many nut shells have very high lignin content and may represent both the minimum of decomposition rate and minimum total degree of decomposition among readily available plants or algae. Some species have preservative oils and extractives that discourage decomposition. Redwood and eucalyptus species for example have low decay rates due to protection afforded by other resinous chemical constituents of the lignocellulosic material.

The slow, partial anaerobic decomposition of lignocellulosics will produce methane and carbon dioxide. Most soils contain plant roots that decompose anaerobically and the methane produced feeds methanotrophic organisms in the upper, more oxygenated layer of the soil. Most of the soil produced methane from subterranean plant decomposition does not enter the atmosphere but is instead consumed by methanotrophic microbes before this occurs. Underneath some structures there would be little to no methanotrophic activity and so lower methane emissions are desirable underneath structures in comparison to under adjacent open or plant covered terrain.

For this reason, it may be desirable to use more lignin-rich lignocellulosic materials directly underneath structures to protect these structures whereas more cellulose-rich materials may be quite satisfactory under grassy areas or areas covered by lignocellulosic mulches where methanotrophic activity is enhanced. By the same token more decomposition resistant species, for example redwood tree chips, may also satisfy the desire to reduce methane production under structures.

Larger lignocellulosic particles when injected into a subterranean space do not deform as easily under load as smaller particles. Fifteen (15) mm wood chips will maintain a greater flow rate of water around them than a comparable mass of saw dust under a comparable compression supplied by the weight of overburdening soil. This is significant when the water pressure is removed and the aperture allowed to relax. Fine solids will compress more and coarse solids will compress less which leaves more open water channels. The excess slurry water will exit the injected solids rapidly if those solids are more coarse and slowly if the solids are very fine. A slurry of fine materials may be injected into a space filled with coarser particles to fill the open spaces between larger particles. This creates several valuable opportunities to manage how solids are added to a space over time and over multiple injection events.

It may be beneficial to fill a loose mass of coarse particles added over multiple injection events with a final injection of fine materials to help solidify the solids in place and increase their density by filling gaps between the solids. It is also important as a tool to control where within a subterranean mass of solids water can flow easily and where its flow will be restricted by sawdust filled gaps between larger particles.

The slurry formation process is a key aspect of the art which this disclosure enables. There is advanced slurry formation technology that is well-known to those with skill in the art which enable time-dependent control of slurry viscosity to enable low viscosity at the surface, that rises to higher viscosity when viscosifying agents are crosslinked to thicken the slurry and break open formations and entrain heavy solid proppant particles to drag them into subterranean formations. Chemical "breakers" then chop up the polysaccharides and other long chain molecules that once thickened the slurry to bring the viscosity back down near that of water. The low viscosity liquid can be drawn back out of the formation leaving the proppants behind. The timing of the process is carefully controlled by still other chemicals known variously as delay agents, stabilizers, and activators. The chemical systems and technology developed for the sophisticated petroleum hydraulic fracturing industry would prove very useful in many applications envisioned in this disclosure; however, viscosity control using these systems is unavoidably expensive.

The presently disclosed systems and methods exploit the unique capabilities of lignocellulosic material subterranean injection to protect structures can be most efficacious when used at the very lowest cost because many billions of cubic meters of injection solids must be placed to protect many millions of structures. Doubtless lignocellulosic materials will be used with chemical viscosity control as important embodiments but it is the enablement of the simplest and lowest cost slurries which in the end will be a primary contribution of the presently disclosed systems and methods.

The slurry formation apparatus blends the lignocellulosic materials which may have minor contaminants as mentioned herein with the water which may optionally be brackish and any desired additives such as viscosity control agents or others mentioned earlier to form a slurry with a controlled solids content for presentation to a pump.

Figure 3:
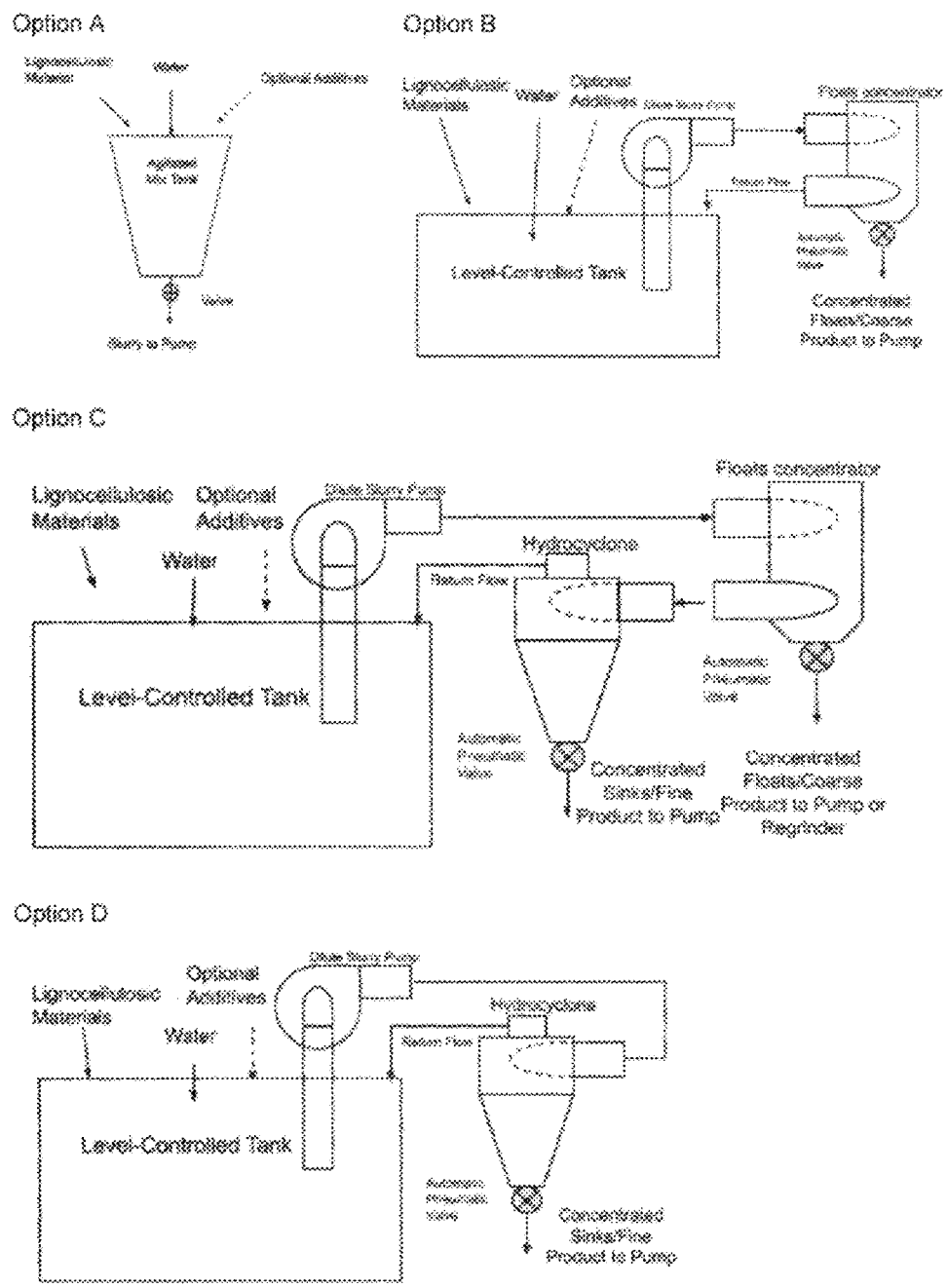
FIG. 3 illustrates optional varieties of slurry formation apparatus.

Three varieties of slurry formation apparatus are illustrated in FIG. 3. Option A is a batch system in which fixed amounts or solids and the liquid are blended with an agitator, ribbon mixer or by tumbling as in a batch cement mixer. The batch is pumped into the aperture, the valve is closed and a new batch is prepared.

Slurry formation Option B illustrates the use of a novel device called a centrifugal concentrator for floats. The concentrator allows delivery to the injection pump of lignocellulosic materials that float in water (at surface pressure conditions) and enables control over the slurry concentration. The concentrator creates a spinning mass of wet lignocellulosic material that remains in place above the pump suction. The raw solids and any additives are delivered to a fluid level-controlled tank. A self-priming slurry pump as illustrated in the figure or (other pump variety) then delivers wetted materials that are entrained in the water to the concentrator positioned above the injection pump suction and flowing through a preferably pneumatic pinch valve. If the valve above the injection pump is closed the solids rotating in the mass will build up and be re-entrained by the lower tangentially exiting flow returning to the level-controlled tank. This provides an automatic way to continuously feed the pump a controlled and high concentration of lignocellulosic floats.

Slurry formation Option C includes all the equipment of Option B with the addition of a hydrocyclone on the tangential return line from the floats concentrator. This hydrocyclone removes dense solids that sink in the aqueous fluid. The sink materials will typically contain small diameter particles and particles with high aspect ratio. Sand, gravel and coarse heavies will also deliver at this location. Smaller diameter lignocellulosic materials will typically saturate with water more quickly and their density will rise. These sinking particles may be delivered to a second pump, for example a progressive cavity pump. Both a floats and a sinks stream can be delivered simultaneously to different well locations in dual product mode. These locations may optionally feed different apertures or may feed an expanded aperture in different locations as explained later.

Optionally the dual outlet configuration can be used in conjunction with a grinding circuit. In this mode the floats product (coarse) that delivers to the apex of the first centrifugal concentrator can be dewatered and returned to a grinder for further size reduction. This works well with very fibrous materials that can be problematic to screen in a dry state due to binding and the possibility of fires or dust explosion. The denser and more fine sinks product may be delivered in a concentrated state to a slurry pump for injection. This creates a safer and less energy intensive way to produce fine particles for a slurry. It reduces overgrinding and dust generation as well as energy use while still creating a reliable fine particle concentrated slurry at the hydrocyclone discharge.

The cone angle of the hydrocyclone may be made larger, for example from an industry standard 20 degree included angle to a higher included angle such as 30-90 degrees. The larger this angle the larger will become a rotating bed of dense material awaiting discharge from the apex. A level sensor in the small feed cone above the dense discharge pump may be used as a control signal to adjust the diameter of the pneumatic apex. A low pump feed level would result in a signal to increase the apex diameter by reducing the air pressure in the pneumatic apex of the hydrocyclone. As more material is withdrawn from this rotating mass by increasing the dense pump outlet volume and therefore increasing the controlled apex diameter, a higher fraction of the incoming feed material will take a place in the rotating body of solids awaiting discharge. As the discharge volume decreases, more rotating material in the bed will instead be re-entrained by the flow of fluid exiting the vortex of the hydrocyclone with residual float solids in the feed and will report back to the initial slurry tank.

A unique character of this slurry formation option operating in dual product mode is that the relative amount of production of both the floating (coarse) material and the denser sinking material will vary to a significant extent with the relative rate of their withdrawal by their respective pumps. Therefore, if more dense material is required the dense removal pump rate may be increased and this will have the effect of raising the percentage of the feed that reports to dense material because the size of the rotating bed of material is smaller and more solids will join the bed at the margin of material close to the sink/float cut point of the feed. Adjusting the apex or vortex diameter in the floats selection concentrator and the cone angle, vortex finder diameter, and apex diameter of the dense selection hydrocyclone enables controlled partition of many varieties of lignocellulosic feeds. Each variety of Lignocellulosic material may be partitioned into a more buoyant light (and often coarse) fraction and a more dense heavy (and often fine) fraction over a wide range of ratios of floats/heavy flow splits.

Alternatively the floats concentrator can be bypassed and the dilute slurry pump made to feed only the hydrocyclone as shown in slurry formation apparatus option D. If the hydrocyclone is used as in this option a sinking particle stream alone is available and any floats will be returned to the dilute slurry tank. This optional configuration is useful when only fully saturated fine products that sink are desired in the slurry placement and this mode is a single product mode.

The level of concentration of the slurry depends on the variety of the pump to be used in addition to the flow rate required to open the subterranean aperture and the requisite pressure. A centrifugal slurry pump is an attractive option if injection pressures measured at the surface are 500 kpa or lower. Centrifugal pumps will have significant pressure limitations when high pressures are required to create fractures but the pressure required to fill an open aperture is often significantly lower than that required to create a fracture. Centrifugal pumps work well in situations where the formation aperture to be filled with solids is quite porous and at a depth shallower than 23 m. Centrifugal pumps work better on lower solid volume fraction and so more water per given volume of solids placed in the aperture must escape the structure to allow the solids to carry the overburden.

A head box can also be used in unusual situations where a 20-50 m high tower or hillside is immediately adjacent to the injection location. The water and the solids are combined in a box opening at the top of a vertical pipe. This avoids the problem of solids passing through a mechanical pump but is only useful when a large supply of water and solids are available at an altitude significantly above the injection altitude. A head box is not useful to supply the usually high pressures of fracture formation as mentioned above for centrifugal pumps A positive displacement pump enables higher injection depths with higher slurry solids loadings. Piston pumps such as those used to pump concrete and stucco are quite suitable for injection with solids up to perhaps 25 mm in size for very large pumps but more frequently around 15 mm. Progressive cavity pumps are a very good choice if solids are perhaps up to around 10 mm. Progressive cavity pumps can be reversed to pull fluid out of a well while still providing backpressure to the fluid. In this way, they can be used to meter flow out of a pressurized aperture. Still other pumps available to those skilled in the art may prove useful for this purpose.

A pneumatically compressed bladder subsequent to the pump may be a particularly effective check valve variety for trouble-free passage of large solid particles. The pneumatic bladder may be inflated after the pump positive stroke to reseal the subterranean pipe from backflow and the bladder may be deflated to enable the passage of a subsequent charge of slurried solids. This may be carefully and automatically timed for best effect.

Figure 4:
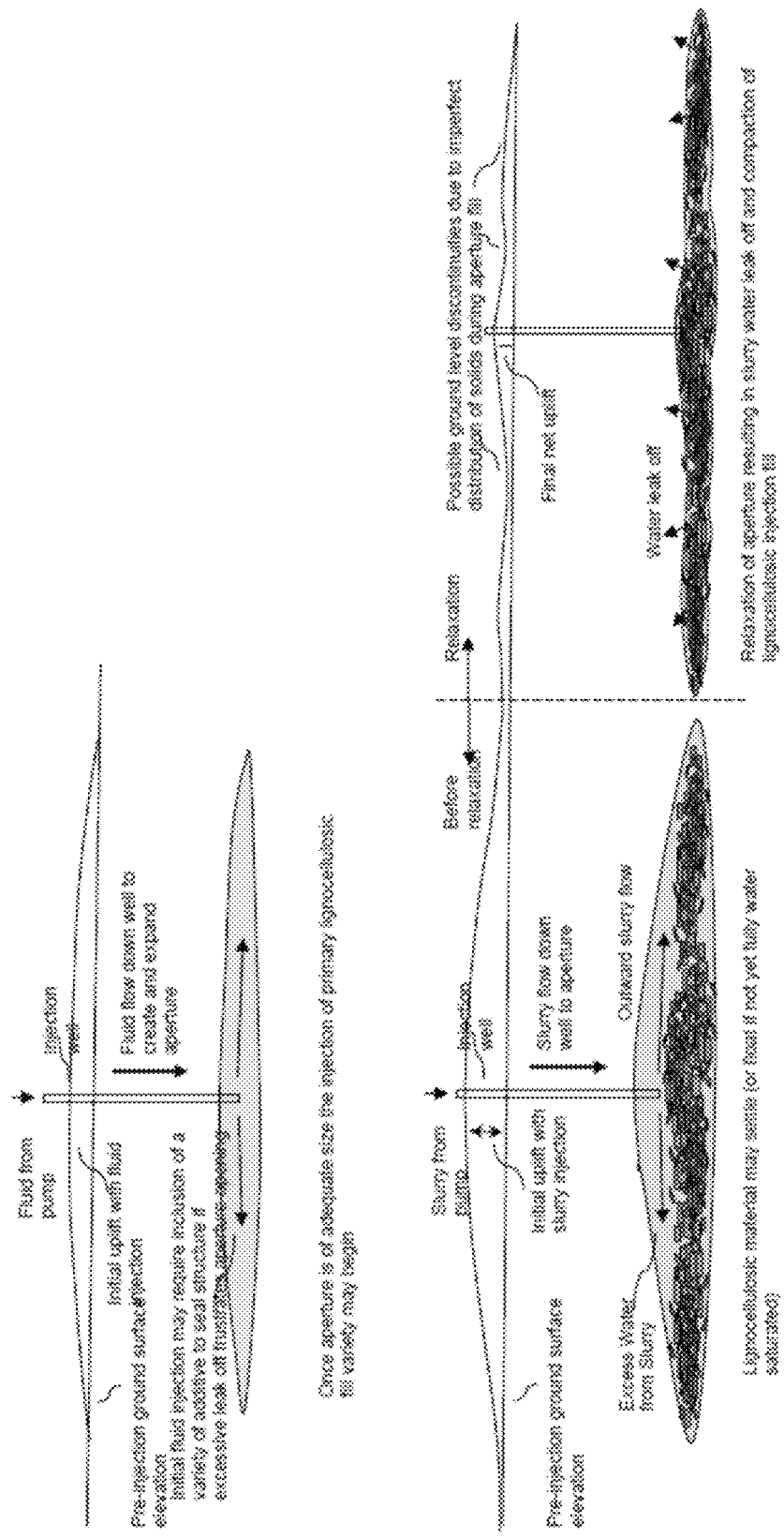
FIG. 4 illustrates slurry placement technique option A wherein a single well aperture is expanded with fluid and subsequently filled with a single variety of lignocellulosic solids and then relaxed.
Figure 5:
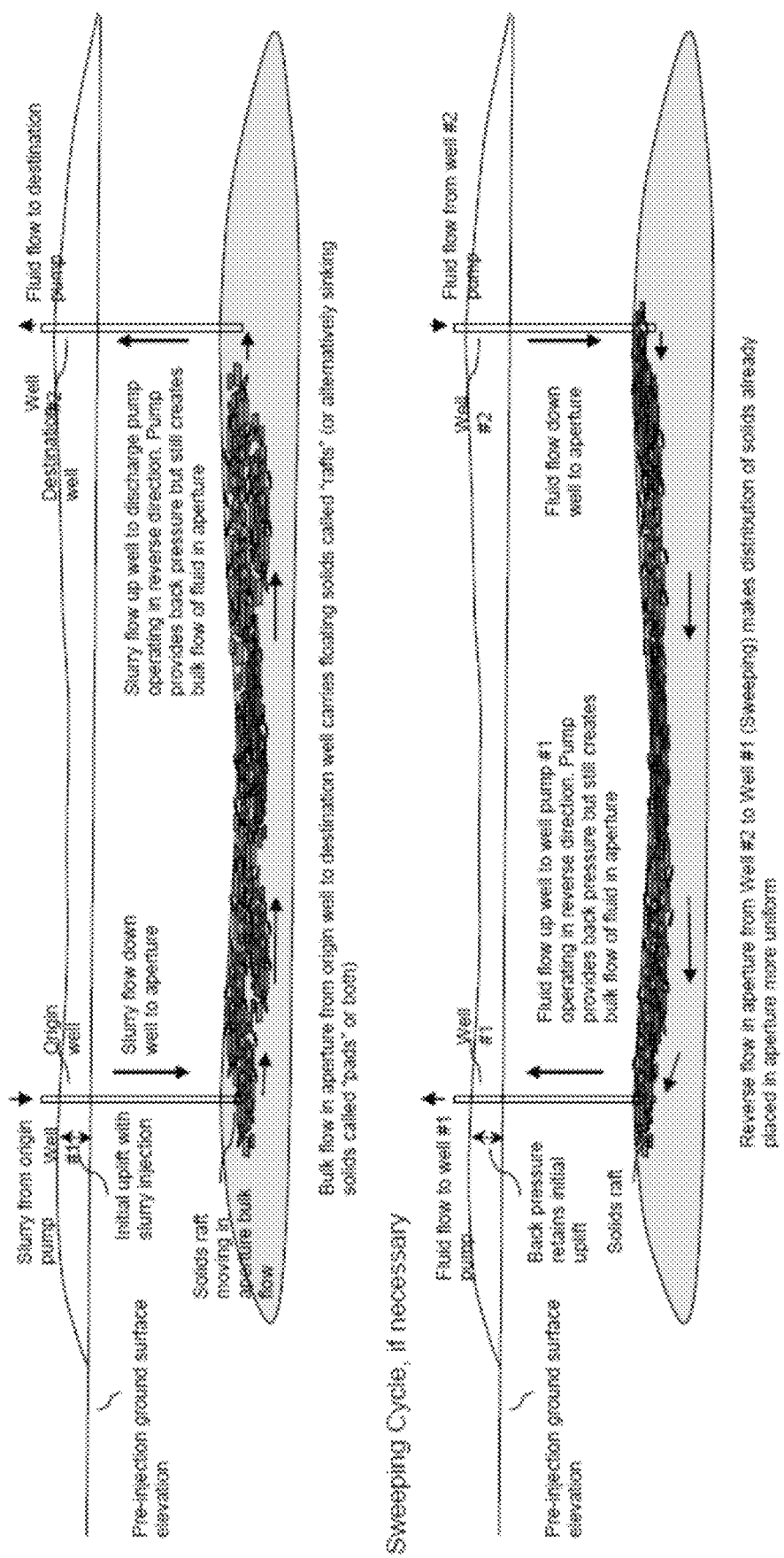
FIG. 5 illustrates slurry placement technique option B employing a dual well aperture and directional bulk flow with reverse flow sweeping cycle.
Figure 6:
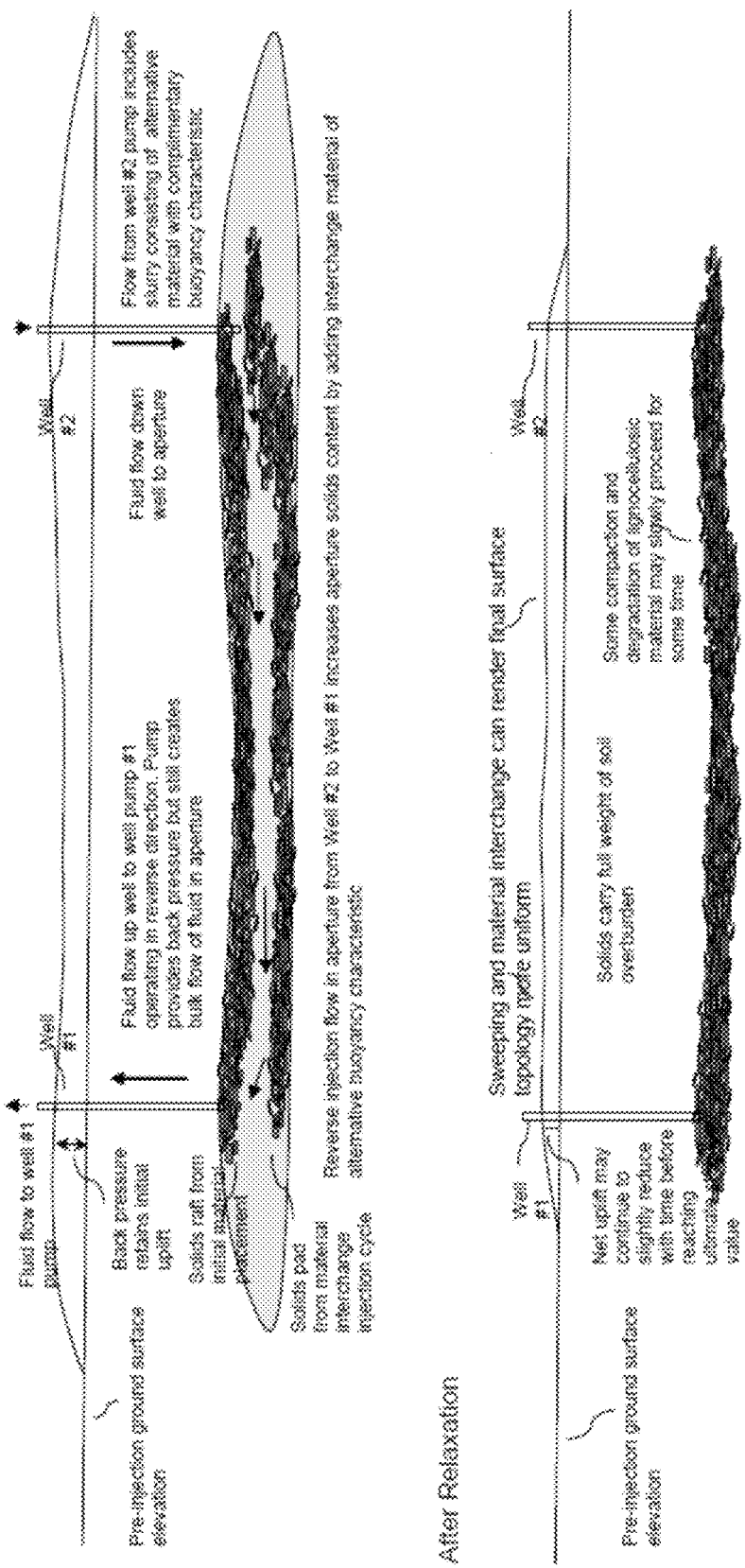
FIG. 6 illustrates slurry placement technique option C dual well aperture injection with material interchange to add a different variety of solids in reverse flow.

The placement of the slurry may follow a variety of strategies three of which are shown in FIGS. 4, 5 and 6. Option A illustrated in FIG. 4 is a single well, single material placement. FIG. 4 also shows aperture enlargement with fluid pumping to open the aperture size adequately to avoid problems when a primary lignocellulosic solids injection particle size is larger than the initial dimension of the aperture height which may create a solids flow problem. This is the simplest placement strategy and may be used to initiate subterranean lignocellulosic injection operations at a site where plans include multiple well locations and multiple materials for placement. FIG. 4 also illustrates the process of aperture relaxation with leak off of fluid into the subterranean structure. The single well injection strategy typically results in a subterranean orientation of fill materials that is roughly symmetrical about the injection well location as illustrated. Subterranean structures and conditions may substantially alter the material placement away from this generalized symmetrical pattern in any given specific well location.

The first important piece of information that must be understood about any given location is the level of porosity of the geotechnical structure at the injection site. In the extreme case the structure will be so porous that the injection pressure will not rise to indicate that a fracture is forming because the permeability of the injection zone exceeds the capacity of the pumping system at the pressure requirement associated with that depth. Viscosifying agents such as clay are added in Germanovich and Murdoch but an excellent option is fine particle size lignocellulosic materials such as those which may be continuously produced by a dense solids removal hydrocyclone such as that described in slurry formation Option C or D. These fine materials can beneficially reduce water leak-off rates by plugging the pores of the subterranean structure particularly during fluid leak off when the aperture grows quite large.

As an alternative a different variety of lignocellulosic solids may be chosen such as grass and leaves or algae to more efficiently block water escape from very permeable structures. This type of consideration helps inform the material pre-selection step of the slurry placement sequence.

The Option B placement strategy illustrated in FIG. 5 is directional bulk flow with backpressure. As discussed in Germanoch and Murdoch, an array of wells may be used to create a large horizontal aperture under an area where adjacent wells are in hydraulic communication with the same subterranean space. In this way the overburdening earth can rise and fall as a slab in the ideal case. Slurry solids (in Germanovich and Murdoch mineral solids are described) can be sequentially injected into various wells in the array while other adjacent wells are sealed to allow fluid leak off of slurry water through the formation. The substitution of porous lignocellulosic slurry particles enables the ensuing invention of a different way to utilize the array of wells.

As illustrated in FIG. 5 the adjacent well may be used to actively draw the slurry water out of the formation. The lignocellulosic solids of most types will settle or float relatively quickly when flow velocity slows as they move away from the injection well and into the aperture. As they do so a nearly clear liquid space will open toward the center of the flow depth because material will move toward the roof or the floor of the aperture space but away from the middle. A mixed float and sink material will yield an open space in the center between a raft and a pad. A uniformly floating material will result in an open space below the raft. A uniformly sinking injection solid will result in a space above the pad. The floating particles will form more dense entangled rafts and the sinking particles will form more dense entangled pads. In each case the inward most particles will be those that are the most neutrally buoyant and therefore the most easy to dislodge and move horizontally. If the rafts or pads are thickened in areas around the aperture, representing uneven solids fill, the free channel space in these thickened areas will be diminished and the gap will be tighter. Instead of sealing adjacent well-bores as Germanoch and Murdoch propose, with lignocellulosic particles the excess water in the aperture formation can be directly pumped out of the adjacent well by reversing the flow of the progressive cavity screw pumps or switching the check valve directions on piston pumps.

This reversal of the pump direction provides the opportunity to maintain the elevated pressure in the formation using feedback control of the pump flow rates. As the pressure rises at the base of the adjacent well where aperture water is exiting, the exit pump flow rate may be increased to bring the pressure back into the control range. The solids-feed well pressure transducer provides a signal that increases the slurry feed rate as the pressure falls. This enables a bulk flow of slurry to move from the first well to the adjacent well sweeping solids along with it. This increases the control over where the solids move in the formation and how far they may be made to travel. The bulk flow of fluid may be thought of as a fluid rake that both makes more uniform the distribution of solids which have accumulated in thicker rafts or pads and carries solids farther. In the simple central injection radial transport model of aperture fill, the velocity of solid movement in the radial direction falls with the radial distance from the center. In a bulk flow model a stream is created that has near uniform velocity that does not appreciably diminish with distance from the injection well. This uniform and higher velocity sweeps the solids with it.

Instead of relying on liquid leak-off to slowly occur through the formation it is possible to rapidly remove relatively clear water from the formation once the local injection phase is done and the rafts and pads have formed and been leveled by repeated flow and backflow of fluid. Once the introduction of additional solids is stopped, clear water may be injected into each well while sequential adjacent wells rake and spread solids within the space in each of the surrounding directions around the well that was injecting the solids. If for example four wells surround the injection well in a grid. Flow may first be drawn toward well #2 in the figure until excessive solids appear in the #2 well outflow then flow is briefly reversed and well #2 injects clear water to flush the solids back into the formation while well #3 withdraws. Once the well #2 bore is flushed the flow of clear water to well #2 is stopped and well #1 once again pushes water into the formation which is drawn toward well #3 until excessive solids appear. Clear fluid is then pumped down well #3 to clear the bore while fluid is withdrawn from well #4 etc. This sequence of directional sweeping and distribution of solids enables active leveling of the subterranean fill while the aperture is expanded and its pressure is maintained within a defined range which holds the aperture open.

After the sweeping phase is complete the water may be removed from the aperture as the pressure of the formation is rapidly released by slowly drawing water up each well until the pressure falls satisfactorily at each well or excessive solids appear in the fluid at that well. This accelerates the relaxation process for the system of wells.

Directional bulk flow enables wells to place solids toward one side in greater amount. The well can be near the edge of a one-sided filling aperture rather than generally in the middle of the solid fill of an aperture. This improves the ability to demarcate edges of elevated areas more precisely. Solids are swept toward one side of the well by adjacent wells which pull fluid and so direct the flow of placed solids. This is useful for example when a highway is to be elevated but the surrounding terrain is not. It is also helpful to shrink the area of uplift produced on a land parcel and avoid the tilting of adjacent structures which are not to be elevated. Directional bulk flow also enables better economy with injection solids consumption.

Option C, Directional bulk flow with backpressure and material interchange. This option has the same capabilities as Option B with the enhancement that it can inject either a floats-concentrated product or a sinks-concentrated product because a preselection process has created these two available lignocellulosic feeds. As an alternative slurry formation process, Option C produces a concentrated dense (sinks) product and a concentrated buoyant (floats) product, as described earlier. If the initial well, for purposes of illustration, injects floats, the adjacent wells can inject sinks.

Such a scenario is illustrated in FIG. 6. Floats contain predominantly solids that will form a floating raft in the expanded aperture space and importantly leave a relatively clear path for water to flow toward the bottom of the aperture space. The adjacent wells can inject sinks which have predominantly solids which will form a sinking pad. The alternation of these two varieties of well solids creates the opportunity to more rapidly and efficiently fill the whole height of the aperture with first one material and then finish off the fill process with the alternative missing complimentary material. The fill process can efficiently feather the solids together enabling more rapid fill while still enabling the alternating sweep process to level up the solids placement.

The subterranean injection of lignocellulosic material has substantial novel benefits including: Improvement in the seismic performance of elevated structures, Very long term sequestration of atmospheric carbon which has been incorporated into plant solids, Elimination of fire and pollution risk associated with combustion of plant lignocellulosic material, and Potential Seismic Benefits.

Injection of wood chip materials into the ground at various depths can alter the mechanical performance of the local surface to earthquakes or ground perturbations in a variety of ways that protect structures. Two important mechanisms for structure damage in seismic events are soil liquefaction and transmission of motion to structures. These effects are not significant considerations for lignocellulosic materials placed below 100 m deep in soil because at 100 m or greater depth their significance is outweighed by the influence of the intervening soil but in shallower placements are quite beneficial.

Soil liquefaction in earthquakes results when soils lose strength and stiffness as a result of applied stress. It is mostly observed in water-saturated, loose, sandy soils. The applied stress causes particles of soil to lose contact with one another and the soil water pore pressure to rise. Mechanisms for desaturating soils are described (Cheng Shi et al 2019 Soil Desaturation Methods for the Improvement of Liquefiable Ground IOP Conf. Ser.: Mater. Sci. Eng. 562 012015 and Microbe-based Soil Improvement Method JP2012092648A) which discuss methods for introducing gas bubbles in the soil. The gas bubbles can compress during a seismic event as water pore pressure begins to rise and significantly enhance soil resistance to liquefaction. Gas bubbles introduced into the soil structure as described above whether by their presence in the interstices of wood chips or other biomass pores or through the slow decomposition of the wood chips to form $CO_2$ or methane will also compress in response to rising pore pressure in surrounding saturated soil. This is expected to protect the soil from liquefaction to some extent.

The injection of wood chips into the soil will alter the mechanical characteristics of soil in other ways. Many varieties of biomass are long and fibrous and thus have tensile strength that can be translated to the soil structure. This tensile strength generates confining pressure in the soil to resist loads. Multiple levels of horizontally oriented lignocellulosic layers would be expected to reduce the soil movement in a horizontal dimension such as might be caused by the placement of a high vertical load on the column of soil. Wood chips are compressible and can rebound if stress is reduced. If a time variable and high level of stress is applied normal to planar mass of wood chips the compression of the chips would be expected to alter the maximum stress level transmitted to the soil or rock on the opposite side. If the stress is applied at a frequency, the presence of the springy wood chip plane might be expected to alter the frequency of the stress transmitted across the plane under many circumstances.

A saturated porous body of wood chips enables movement of water in response to variations in soil stress. The presence of vapor space within the wood chips can enable small local movement of water to compress the trapped vapor instead of moving the stress freely through the soil or rock structure. Also, the wood chip body can allow small movement of water toward lower resistance regions for example upward movement of water in a vertically oriented plane of wood chips. This enablement of movement introduces a level of viscous dissipation to the soil or rock.

The fundamental mechanical character of the ground structure beneath a construction can be altered with these characteristics in mind. The strategic application of wood chip layers in different orientations such as vertical, horizontal, inclined, cupped or bent can represent one variable to be engineered. The stacking of these planes or shapes in any given dimension can create intricate distributed reinforcement. The porous layer of wood chips may be used to provide a protective channel through which water is directed around, underneath or away from an area. The thickness of the layer or in various parts of a given layer and the variety of biomass within regions will materially alter the stress and strain behavior and porosity of a body of wood chips. This may be thought of as adjusting the spring constant of the ground for various applications of stress. The center of a layer may be of one character while the periphery is of a different character. The viscous dissipation character and the dimension within which the dissipation is most pronounced may also be thoughtfully adjusted. The quantity of sequestered vapor which plays an important role in enabling dissipative movement of water and of the ground may be adjusted by selecting different types of wood chips (biomass) whether by selecting those which possess more isolated vapor or those types which decompose to a saturation level of vapor and thus renew any vapor that may be lost with time. A very small addition with time of additional nutrients, oxygen or microbes (as partially described by Cheng above) may also be used to tune vapor inclusion or regeneration.

The ground structure can thus be tuned in a variety of ways to protect structures from frequencies of ground movement to which those structures are most vulnerable. The frequency, direction and intensity of stresses applied by seismic events to structures may in these ways be engineered. The ground may be designed to be most protective of planned or existing structures. A building or structure may thus be tuned in conjunction with its ground structure to provide the most cost-effective protection from seismic ground movement or liquefaction or from damage caused by the movement of water within the ground such as that which can cause sinkholes. This may all be done at the same time that other aspects of the area such as its surface elevation are changed.

Controlling the extraction of reaction products as mentioned above can be used as a mechanism to regulate decomposition rate and the formation of new gas bubbles. In addition to adding oxygen, or required nutrients such as fixed nitrogen or phosphorus may be expected to maintain desirable gas bubbles in a subterranean wood chip area to enable continued protection from ground movement or rapid increase in pore water pressure.

Using this combination of benefits, areas may be simultaneously protected from rising sea level or subsidence of land below sea, lake or river levels as well as from ground movement events and liquefaction of soil. Elevation of areas protects from rising relative water levels while altering soil mechanical nature gives additional protection from ground movement such as earthquakes.

Hypothetical situations will be described that show how the disclosed techniques may be preferentially used to best effect under imagined conditions. The information provided is supported by experimentation with the various materials, literature values for subterranean structure information and equipment related knowledge and experience. The preferred embodiment depends on a wide-variety of site-specific conditions and goals and so the detailed decision making methods described in the specification yield different preferred choices for different sites.

Figure 7:
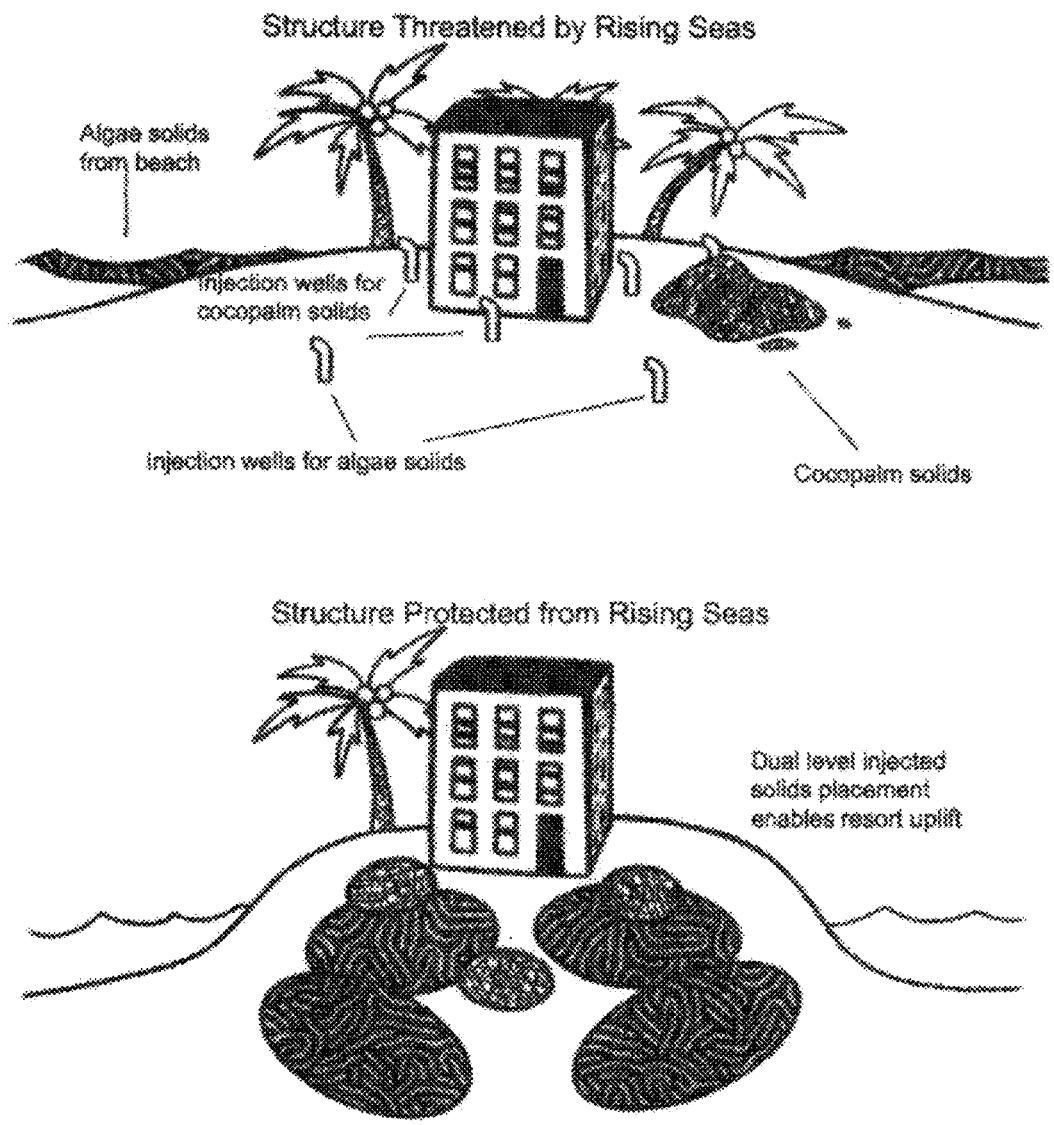
FIG. 7 illustrates a hypothetical resort uplift example.

An island resort, illustrated in FIG. 7 is facing inundation due to sea level rise and there is no available mineral fill material locally. A large nearby lagoon hosts extensive algal growth due to local use of fertilizers to grow food and coconuts. The lagoon also serves as a catchment for some floating plastic debris which is unsightly. The decaying algae washes up daily contaminated with fine floating plastic in large moist piles and creates noxious odors as it dries and decays in the sun.

It was decided to elevate the resort by 1 meter over a period of 10 years with a combination of the two most abundant lignocellulosic biomass materials that are available: algae and coco. The sequence of steps provided in FIG. 1 was followed to guide the process. First, the approximately three hectare space around the resort was selected for elevation. Then, the starting elevation of the resort was 0.3 m with a uniform level grade. Next, the geotechnical profile of the area includes a relatively uniform partially cemented coral rubble (conglomerate) with cemented beach sand (beachrock) and sand. There is an underlying lithified reef at a depth of 10 meters. Based on this information, elevation apertures at a depth of 20 meters were used to elevate the three hectare yard of the resort. Ten (10) meter deep apertures were used at the interface between the lithified reef and the cemented coral conglomerate sand profile to ensure precise leveling of the resort building which occupies 1,000 $m^2$.

Next, four injection locations were selected for the 20 meter deep wells at a radius of 49 meters from the center of the resort along the center of the resort's North, East, South, and West profiles. Four additional well locations were selected for the 10 meter deep wells at a radius of 18 meters from the center of the resort in the center of the Northeast, Southeast, Southwest, and Northwest profiles.

The eight wells were drilled and a 100 mm well pipe was cemented and sealed in place with a capillary pressure transducer placed at the base of each pipe to allow accurate measurement of aperture pressure. A level controlled tank on one edge of the yard supplied seawater for well slurry preparation and injection. A batch slurry preparation area for the partially dehydrated algae which was collected from a beach on the lagoon at a distance of 150 meters from the resort was used for the 20 meter injections. A common piping system for the four algae wells was buried in a shallow trench running to each well. A second coconut and cocopalm grinding area 150 meters from the resort was utilized to supply the four shallow wells close to the resort building. These wells were also joined with a piping system run in a trench. A manual well selection system for each well type could supply pump pressure to any given well while sealing the three others.

A 20 MPa high pressure jet pump was used with a rotatable pressure pipe to score the lithified reef stone at the base of each 20 m well in a 360° arc to a radius of 50 cm to initiate the aperture. The jet pipe with the nozzle removed was then temporarily placed with a removable pressure packer at the base of the hole to protect the well piping from high pressure. The base of the well was pressurized with the jet pump using a pressure relief at a maximum pressure of 3 MPa. The lithified reef stone began to crack as the pressure was slowly elevated and as the crack opened the aperture formed at the base of each well. The jet pump hardware and packer were removed.

No jet pump was needed with the 10 m wells because the apertures were to be located at the interface of the lithified reef stone and the sand and partially cemented conglomerate layers. The progressive cavity pump was used to pressurize the structure but it was found that a high level of leak off occurred on the structure initially. The algal material which forms a thick paste when the water content was reduced was pumped into each well and quickly sealed the leaky subterranean structures enabling sufficient pressure to begin opening the apertures at the base of each 10 m well.

Progressive cavity positive displacement pumps were used to pressurize each well system and expand the apertures. Surface altimeters and tiltmeters were used from this point forward to monitor the topology of the surface in preparation for placement of lignocellulosic materials in the apertures.

Slurries were prepared for the 20 m wells with a batch slurry preparation in agitated tanks because the partially dried algae with some fine plastic debris and sand readily formed a thick slurry suitable for placement according to FIG. 3 Option A, to feed the progressive cavity pumps. No grinding or sand and plastic debris removal was done to preselect the slurry material. The algae material was used in a sufficiently thick state to eliminate floating and separation within the piping system which reduced the need to clean and flush piping. The thick algae slurry was quite stable at a 20% by volume solids content. An elevation of 100 mm per year was targeted for the surface above the 20 m wells and a schedule of injection was chosen that allowed each of the four wells to be injected every 2 weeks with a net elevation of 8.3 mm each month for each well.

Slurries were prepared for the 10 m coconut wells with a centrifugal concentrator with the hydrocyclone as detailed in FIG. 3 Option C. The floats/coarse product returned to the grinder and the hydrocyclone fine/dense product which was well saturated with water delivered to the 10 m wells. It was also important to ensure that the product sent to the wells was well saturated with water to ensure that materials would not saturate with water within the piping system and swell in place or bind up as free water was drawn into the slurry particles. The system operated using seawater and a mixture of 50% by volume milled coco palm frond and wood with 50% milled coconut shells and husks. The particle size was 3 mm or less. The dilute slurry pump drove the centrifugal floats concentrator and the hydrocyclone.

A progressive cavity pump delivered the prepared slurry to the wells at about a 12% solids content by volume. Monthly injection was done because the particle size of the material required larger spaces for penetration so lifts of less than 14 mm did not yield good solids flow. Elevation was done as required to maintain the building level with the elevating yard and avoid unacceptable tilting or differential elevation that might damage the building.

The slurry piping was rinsed after each injection cycle for both wells.

The release of excess water from the algae wells required more than a week and a settling of about 75% occurred which required that the initial lift of ground surface every two weeks was about 15 mm. Release of water from the coco wells required only several hours and a settling of about 50% occurred which required about 16 mm of elevation to achieve a net 8.3 mm of lift monthly.

An assessment was done of level changes due to elevation and settling and planning of future injections was done accordingly. The yard area was covered with a 40 mm layer of coco mulch to control weeds and provide ample habitat for methanotrophic bacteria which would oxidize methane release primarily from decomposition of a portion of the algae. There was less methane emitted from the coco fill around the structure as planned since coconut has a very high lignin content and degrades much less anaerobically than does algae.

A San Francisco Bay area highway was built on ground constructed after the 1906 earthquake by filling in a portion of the bay. It crosses a portion of a meandering old stream bed that ran through a salt march into the bay. The highway is particularly subject to damage from seismic soil liquefaction and lateral spreading. This area has undergone extensive subsidence and with rising sea level faces inundation routinely several times a year during king tide or storm events. It was decided to elevate the highway.

It was decided to elevate a 300 m long section of the two lane highway 30 m wide by 1 meter over a period of one year. Using 6 mm and under fir bark fines available from the California forestry industry. The sequence of steps provided in FIG. 1 was followed to guide the process.

First, the approximately one hectare, 30×300 m rectangular space beneath the roadway was selected for elevation.

Second, the starting elevation of the highway was 0.3 m with a uniform level grade.

Third, the geotechnical profile of the area includes a relatively uniform dredged fill to a depth of 5 meters over a sandy consolidated bay mud profile that extended to 30 meters, followed by a cemented mudstone layer to a depth of 50 meters Based on this information, elevation apertures at a depth of 30 meters were selected to intersect with the mudstone interface.

Figure 8:
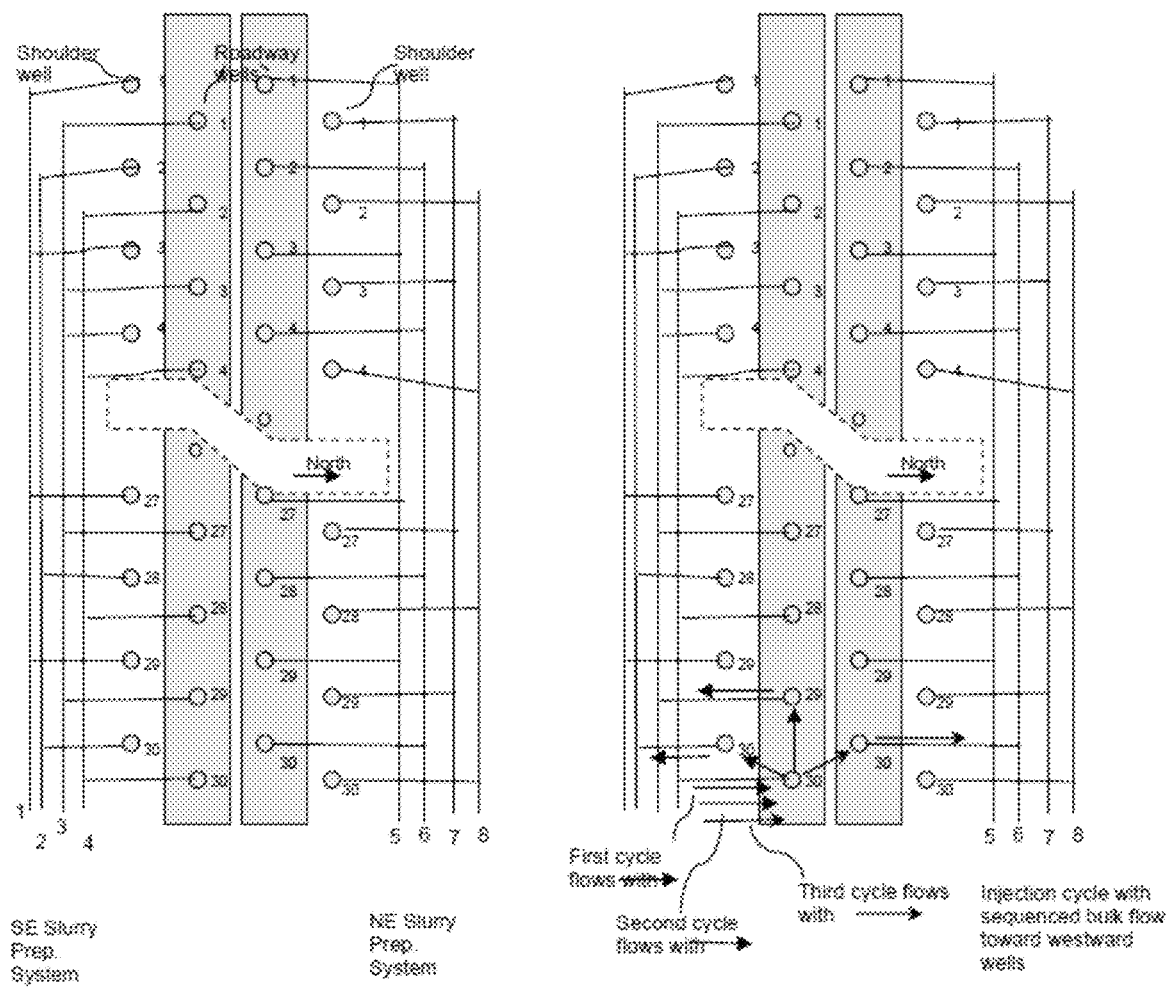
FIG. 8 illustrates a hypothetical highway elevation project with bulk flow.

Fourth, the fill strategy would require relatively frequent injections of high uplift thickness. A grid of 30 wells on four lines spaced 10 meters apart on a 5 meter staggered grid was selected. A total of 120 wells would be required. The close spacing of the wells was necessary to ensure that by pressurizing the wells the roadway could be lifted as a slab to avoid local bending that might fail the paving surface. The well layout along the roadway and example slurry injection bulk flow sequence are shown in FIG. 8.

Next, the 30 wells on each of the two outside lines were drilled vertically while the 30 wells along each of the two central lines were drilled at an angle from the roadway shoulder in order to avoid shutdown of freeway operation during the project.

Eight pipes were run along the roadway shoulder to manifold the wells. The first pipe manifolded the odd numbered wells on the southern shoulder vertical wells. The second manifolded the even numbered wells on the southern shoulder vertical wells. The third pipe manifolded the odd numbered inclined wells under the southern lane. The fourth manifolded the even numbered inclined wells under the southern lane. The fifth manifolded the odd numbered inclined wells under the northern lane. The sixth pipe manifolded the even numbered inclined wells under the northern lane. The seventh pipe manifolded the odd vertical wells on the northern shoulder. The eighth pipe manifolded the even vertical wells on the northern shoulder.

A progressive cavity pump was installed on each of the eight lines that could run in either forward direction or reverse direction. Each well had a separately actuated pneumatic valve. These wells were also joined with a piping system run in a trench. A sophisticated automatic well selection system could supply pump pressure to any given well while sealing all the others wells along that particular manifold line. All solids were supplied from either a Northeast or Southeast slurry forming station.

Next, the apertures at the base of each well were initiated with only pressure from the progressive cavity pumps because the subsoil interface above the mudstone profile facilitated the crack. The sandy consolidated bay mud profile provided excellent formation sealing so excessive leak off was not encountered.

Next, progressive cavity positive displacement pumps were used to pressurize each well sequentially from East to West and expand the apertures. Surface altimeters and tiltmeters were used in grooves cut in the pavement from this point forward to monitor the topology of the surface in preparation for placement of lignocellulosic materials in the apertures.

Next, slurries were prepared for the wells using a centrifugal concentrator with the hydrocyclone as detailed in FIG. 3 Option C. Slurry placement technique Option C similar to that shown in FIG. 6 is used. The floats/coarse product was fed to the inclined wells under the roadway with the initial placements for the roadway wells moved by bulk flow toward first one westward well, then a second westward well and finally a third westward well. Subsequently the hydrocyclone fine/dense product which was well saturated with water was delivered to the vertical shoulder wells and swept sequentially first to one westward well along the shoulder, and then a second westward well under the roadway. There were two slurry preparation systems on the Northeast shoulder and one on the Southest shoulder.

The fir bark had few binding problems in the piping and so the less saturated float product worked quite well despite incomplete saturation with water. The system operated using baywater. The dilute slurry pump drove the centrifugal floats concentrator and the hydrocyclone.

A progressive cavity pump delivered the prepared slurry to the wells at about a 20% solids content by volume. Injections were done every week. During each injection cycle the floats material was first injected under the lanes while the 3 adjacent wells westward of that well were used to sequentially withdraw water to sweep the fill material first toward the Southwest, then toward the West, then toward the Northwest. After this the sinks material was injected in the shoulder well and the two adjacent westward wells were sequentially used to withdraw fluid. In this way the heavy material was allowed to flow in the gaps left after the floats product was injected under the lanes. This accelerated the process of filling the aperture and increased the penetration of the material by virtue of the bulk flow. The time required to relax the wells was also reduced.

Next, the slurry piping was rinsed after each injection cycle for both wells.

Next, the release of excess water from the fir fines wells required several days and a settling of about 50% occurred which required that the initial lift of ground surface every week was about 38 mm. Because the elevation occurred in a linear stretch along the road no excessive cracking occurred in the pavement surface.

Then, an assessment was done of level changes due to elevation and settling and planning of future injections was done accordingly. The road shoulder and slope were covered with a 40 mm layer of fir bark mulch to control weeds and provide ample habitat for methanotrophic bacteria which would oxidize methane release primarily from decomposition of a portion of the fir. There was little methane emitted from the fir bark fill around the roadway because fir bark has a very high lignin content and degrades very little anaerobically.

The roadway elevation project provided a degree of base isolation to the highway which reduced the transmission of seismic energy to the highway. The increased vapor bubbles created by the slow decomposition of the fir bark migrated upward through the shallow dredge fill profile which was most vulnerable to liquefaction as well as upward through the sandy bay mud. The presence of these bubbles reduced the tendency for soil pore pressure to rise with seismic activity and so reduced the likelihood of liquefaction of the soil.

The description of the different advantageous embodiments has been presented for purposes of illustration and description, and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

In one arrangement, a mechanism for providing variable back-pressure to the subterranean aperture is provided. For example, a hydrocyclone style separator or other similar centrifugal solids separation device on the flow of liquid exiting the underground space may be utilized. As just one example, a hydrocyclone style separator will provide a variable back-pressure that increases with liquid flow rate. The diameter of the hydrocyclonic separator and its inlet and outlet sizes may be altered to adjust the amount of pressure required to drive a given flow through the unit. In this way, a level of back-pressure may be used that is adequate to maintain the size of the subterranean aperture.

In one preferred arrangement, the formula for the requisite volume of flow that is delivered to the subterranean aperture includes make-up water. This make-up water may be utilized to account for a volume of fluid that may be lost from the subterranean aperture to the surrounding soil structure. In order to maintain a constant aperture volume the following formula may be satisfied.

$$\text{Constant } V_{aperture}, V_{liquid\ in} = V_{formation\ loss} + V_{liquid\ out} - (V_{solid\ in} - V_{solid\ out}) \quad \text{Equation 1.}$$

At the start of a project or elevation, the volume of the aperture must increase and at the end of an injection process, the aperture's volume will decline as the additional liquid added escapes. In addition, the deposited solids are compressed by the mass of the overburden of soil above. While solids are being added to the aperture, the added solids will displace liquid that was added to increase the size of the aperture.

Directional bulk flow of material in one well location while removing liquid from another area of an aperture will result in some solids leaving the aperture with the exiting fluid. Thickeners and viscosifying agents will be present in this flow if these agents were used in the injection fluid. These agents are valuable to recover and fluid reuse enables this recovery while at the same time avoiding the creation of a surface waste fluid. The exiting fluid will contain fine material such as sand and clay removed from the subterranean structure by action of the fluid. This solid material derived from the soil structure abutting the aperture may be returned to the aperture space by recycling.

The continuing addition of fluid and withdrawal of fluid in the directional bulk flow solids placement strategy will cause the level of fine particle size solids which have a long settling time to accumulate in the transportation fluid until their concentration reaches an equilibrium value. This accumulation of fine solids forms an autogenous thickening agent which can complement the thickening agents applied at the surface. This enables reduction of the total requirement for surface addition of thickeners.

Sodium bentonite, calcium bentonite and polymeric thickeners have been observed by others to reduce the tendency of introduced water to destabilize fine grain soil in vertical or horizontal tubular wells. No information was available to characterize their performance in stabilizing horizontal inverted planar surfaces. This would be an important benefit to their use when a horizontal soil aperture is opened because the inverted horizontal planar roof or upper surface of the subterranean space has a tendency to absorb the aperture water and swell. This swelling and water uptake causes destabilization of the aperture roof structure. This can cause a continuing collapse as the soil particles on the roof gain water, loose cohesion and detach to sink to the floor of the open aperture structure.

Techniques of improving aperture roof stability were investigated. A roughly 12% by weight 1.065 g/cc density sodium bentonite slurry was placed in contact with a piece of inverted planar dried modeling clay. A 1000 ppm solution of anionic polyacrylate was similarly contacted with a piece of this clay. These were compared to the performance of a similarly configured piece of dried modeling clay in contact with tap water. The tap water very rapidly caused the clay to form fine particles, which exited like snow falling from the inverted particle and collapsed its structure.

The anionic polyacrylate solution reduced the rate of the clay particle collapse, requiring more than twice the time of the tap water.

The sodium bentonite slurry did not collapse the clay but instead partially hydrated and softened it over a much longer period of time. After agitating the anionic polyacrylate solution with the clay particle the clay particle broke apart completely and was more strongly suspended in the liquid than were clay and water alone.

The combination of clay and anionic sodium polyacrylate resulted in a more stable and pumpable clay suspension than water alone yielded. It was concluded that either bentonite or anionic polyacrylate would provide some protection to collapse for the roof of the aperture by slowing water infiltration.

It is also likely that the related polymer anionic polyacrylamide which is used as a commercial sealant for ponds would also perform well in this regard and by a similar mechanism to anionic polyacrylate. Aperture opening with a bentonite slurry or more concentrated anionic polyacrylamide may suffice to enable longer term sealing whereupon a larger volume of liquid with much less sealant and carrying lignocellulosic solids may be introduced.

Injection of a gas into the subterranean aperture is an excellent way to protect the roof from direct exposure to water that can cause clay to lose cohesion and fall from the roof. The injection of a gas stream may be done by blending with the entering liquid steam or as a separate stream into the aperture space. This gas may then collect at the upper surface and partially shield the roof from exposure to penetrating water. It is desirable to limit oxygen exposure over the long term to the chips which can accelerate degradation. If the gas stream is enriched in nitrogen and thus depleted of oxygen this is advantageous. Air itself is a nitrogen-enriched gas and the roughly 21% oxygen will rapidly be depleted if no new oxygen is supplied once the aperture is sealed. The active compression of the aperture by anchor devices may serve to eliminate much of this gas before aperture sealing.

Tests were performed to verify that the presence of thickeners makes it easier to transport solids to the aperture and stabilize the bounds of the aperture but the tests showed these thickeners also increased the settling time required to deposit lignocellulosic solids. The background for the testing, the rationale for selection of thickeners to be tested and then the tests themselves will be described.

A first requirement to be tested is whether a given thickening system can be pumped. The novel active deposition process here described as directional bulk flow introduces a second requirement that the lignocellulosic solids will accumulate in the aperture. The settling time for the solids must therefore be higher than the time required to transport the fluid with the solids from the aperture entry to the aperture fluid removal location.

Pulp fiber that has been subjected to a lignin removal operation often for incorporation into paper is an attractive thickening agent. It is widely available at low cost and may be sourced in the form of recycled paper or cardboard and repulped in wet-blending devices which are known to those skilled in the art. Our laboratory testing of pulp fibers suspended by blending mixed recycled office paper in a Vitamin 5000 blender. at various concentration in 400 ml beakers with a Brookfield viscometer using a #2 RVT spindle at 10 and 100 rpm are given in Table 1 below where 2% pulp concentrations begin to exceed acceptable viscosity of around 3000 cp at low shear rates. At concentrations under 0.1% require even microcrystalline cellulose pulp particle sizes do not sufficiently thicken slurries to 10 cp. 0.1% SigmaCell type 38 from Sigma Chemical was tested on a Brookfield viscometer with RVT #2 spindle at 100 rpm to give 12 cp. and at 10 rpm to give 16 cp.

Microcrystalline cellulose is quite expensive to purchase and so coarser pulp fibers such as are used in conventional paper may be more cost-effective. Pulp fiber that has been reduced in lignin content has the advantageous property of shear thinning for easier pumping but also gives a minimum yield stress to enable solids settling. A wood chip of insufficient size or buoyancy differential from the fluid will thus not settle if the fluid has a high yield stress to enable particle movement. This creates the possibility of a non-settling slurry which greatly facilitates free slurry flow avoiding clogs and screen-outs which block flow. This is particularly advantageous when injection without fluid removal from an aperture is desired because bulk slurry flow to an aperture discharge location places a limit on the minimum settling rate to avoid lignocellulosic material exiting the aperture.

TABLE 1

| Paper pulp viscosity at low and high shear rates | | |
|---|---|---|
| Mixed ofc. Pulp % | 10 rpm | 100 rpm |
| 2 | 3800 | 200 |
| 1 | 1560 | 94 |
| 0.5 | 140 | 48 |

Table 1 illustrates that pulp fiber slurries have different viscosities at different shear rates. The shear rate in a centrifugal separation device is high and so the lower viscosity of pulp at 100 rpm shear rates is more relevant. When a fluid is pumped into an aperture the higher viscosity at 10 rpm is more comparable. This creates a surprising advantage that can be exploited because pulp fibers when used as a thickener can be subsequently removed by a centrifugal separator from the fluid for potential reuse. The pulp solids settle more quickly with the lower apparent viscosity in the higher shear environment. A pulp-containing viscous slurry can be injected at one location of the aperture to expand and shape the aperture and stabilize the aperture roof with clays, polyacrylate or polyacrylamide sealants. This same slurry can be removed at a different or multiple different locations once the shape of the aperture is perfected. The pulp thickeners can be passed through a hydrocyclone or other centrifugal separator while back-pressure is maintained to ensure the aperture stays open.

The fluid can be returned to the aperture with a different viscosity that is lower once some of the pulp has been removed by the separator. This fluid then has a lower viscosity that is designed to allow deposition and settling of lignocellulosic materials that are now introduced and suspended in the slurry. Polysaccharide thickeners can't be easily removed and must be either diluted, chemically broken apart or discarded. A more viscous fluid is desirable during the aperture formation and expansion process but a less viscous fluid is needed later to enable lignocellulosic solids deposition in the aperture so that settling rates are not too high.

The use of cellulose pulp thickener with fluid extraction after aperture shaping while aperture shape is maintained by back-pressure enables both solids and liquids to be separated and recovered independently for reuse. The aperture forming fluid viscosity may be high while the same fluid may be used with a lower viscosity later for deposition of solids. Polysaccharide gums such as guar or xanthan gums are known to increase the viscosity of fluids but they are costly. It was discovered that by using a combination of 1% pulp fibers and 1% guar polysaccharide gum, a synergistic benefit appeared enabling stable suspension of a lignocellulosic material more than 50% of which did not pass a 6 mm screen. 1% pulp fiber from recovered cardboard was used in these tests but mixed office paper appeared to perform similarly once pulped. A 1% pulp fiber with only 0.5% guar gum adequately suspended a lignocellulosic material 50% of which did not pass a 5 mm screen.

Visual observation of laboratory slurries is believed to be among the more reliable ways of showing adequate slurry performance. A Brookfield viscometer could not reliably gather data on large particle slurries of this type. Similarly a Marsh cone does not reliably pass solids of this size.

Addition of more than 10% by mass bentonite clay solids content to a 10% lignocellulosic slurry yielded a slurry that was judged thicker than would be required in combination with a lignocellulosic placement but useful before placement to assist in opening an aperture.

A centrifugal separation device such as a hydrocyclone accelerates deposition of coarse solids including sand and coarse lignocellulosic materials. Bentonite clay thickeners are shear-thinning and thus their apparent viscosity declines when they pass through a high shear environment inside a hydrocyclone. As fluid is recirculated from the surface to the aperture and back to the surface in the solids placement operation a hydrocyclone may be used to alert operators that one of several conditions will require adjustment: the deposition fluid viscosity may require reduction to expedite lignocellulosic settling rates, the size or degree of water saturation of the incoming prepared lignocellulosic materials may require increase, or alternatively additional exit wells locations might be simultaneously used so as to increase the areal fraction of the aperture through which liquid passes. Increasing the number of exit wells used increases the apparent area of the aperture and thus increases residence time for settling of particles.

An additional alternative to reduce the population of coarse lignocellulosic particles in the exiting flow is to reduce the total fluid entry and exit flow rates.

The location of the active aperture determines the area where solids deposition underground will occur. The balance of forces in the subsoil space determines the location where the aperture will form or persist. These forces are partially determined by the initial stress state of the soil. In one arrangement, these forces may be adjusted by altering the stress state of the soil.

A crack can form when the forces that are normal to the dimension of the crack holding the soil together reach zero at the edge as the crack propagates. Aperture geometry may be actively altered by a system that changes the force magnitude or direction with time in different locations.

As an example, if a fluid-filled aperture existed beneath a roadway and a heavy vehicle moved over that fluid-filled aperture from one edge to another of the aperture, the shape of that aperture would be expected to change in response to the changing load that the vehicle represented.

Many apertures do not open in the desired direction or expand so rapidly outward that adding volume does not increase the aperture height adequately to enable large chips to be injected without fear of plugging.

One method that might be utilized for resolving this potential rapid expansion problem is to increase the injection fluid viscosity. Fluid mechanics study tells us that viscous fluids experience a higher pressure drop when flowing through a distance than do less viscous fluids. Applying this understanding to the problem of expanding the height of an aperture to accept larger particles such as a lignocellulosic material with greater than 50% by mass not passing a 5 mm square screen, it is clear that a by increasing this fluid viscosity, a high pressure drop will be maintained as fluid moves away from the injection port and towards the periphery of the aperture. This creates a high pressure near the injection opening while a much lower pressure is experienced at the leading edge of the expanding fracture. Such a scenario may be created since the high viscosity results in a rapid reduction of fluid pressure as fluid moves outward and away from the injection site.

The viscous fluid can optionally contain some combination of nearly 50% by mass fine mineral material whether from recycle of fluid exiting the aperture or from addition of up to 12% bentonite clay. The fluid may also contain from 40-1000 ppm anionic polyacrylate, 0.1-2% cellulose pulp subjected to lignin removal operation, or polysaccharide gums at a concentration of 0-1% for example guar or xanthan gum. The use of any of these viscosifying materials solely or in combination can achieve the goal of enabling the injected material to act as a fluid jack to increase the local height of the aperture to accommodate lignocellulosic solid particles wherein more than 50% by mass of the material does not pass a 5 mm square opening screen.

In certain arrangements, it may be possible to affect the shape of the underground aperture without the use of expensive viscosifiers by applying forces on the surface layer of ground or by applying these forces subterraneously. This can be done in a number of ways including by the use of large weights, anchored plates, and cables.

Large weights placed in specific locations on the top layer of soil affect aperture shape. For example, weights can be placed around an injection in a ring pattern. The force exerted on top of the soil from these weights increases the pressure necessary to inject material through the volume of soil lying under the ring pattern at the injection depth. This can create an aperture with a higher vertical to horizontal displacement ratio due to the injected material aligning in a vertical column due to the resistance generated by the external pressure created by the weights.

Application of a load at the surface such as from a heavy truck or by filling large water tanks or piling soil above a space are ways to adjust the subterranean forces affecting the aperture. However, there are a number of other ways to adjust the forces affecting aperture location and shape.

For example, a vertically oriented anchoring device such as a shaft, tube, cable or other similar structure may pass through the upper portion of the soil profile and be anchored in the ground beneath the plane of an existing, proposed or possible aperture zone. Applying a tensile force to the vertical oriented anchoring device creates a compressive load downward on the space where the aperture zone might be and provides a closing force on this space. The vertical distance between the points of application of the lower and upper reaction forces determines the areal extent in the horizontal plane of the soil zone influenced by the applied load as is understood by the science of Soil Mechanics. Anchoring devices of various types both above and below the zone to be under compression may be used including soil nails, augers and anchoring plates that pivot to anchor into soil when tension is applied.

One anchoring method that may be used is to drive a single large auger into the ground with a threaded section on the superterranean portion of the auger central pipe or cylinder. A platform or plate can then be made to apply pressure to the soil as a nut is tightened on the threaded section as depicted in FIG. 9A.

Figure 9:
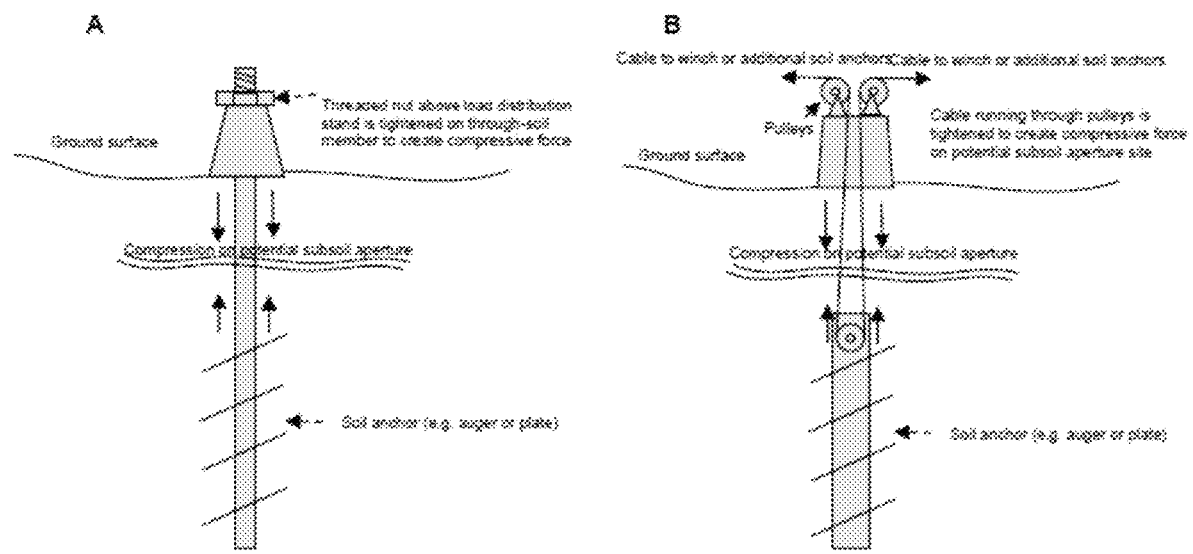
FIG. 9 illustrates two varieties of soil anchoring mechanisms that can apply compression to the soil.

FIG. 9B depicts an alternative technique employing a cable as the tensile member creating the compressive force. In one arrangement, the cable may be inside tubing to avoid contamination of the cable and pulleys with soil. A single cable may pass down to pulleys underground or a stub cable or chain connected to the subterranean anchor may rise to the surface where a surface mounted tensioning arrangement may attach to it. The surface mounted device for applying tension to the vertically rising stub cable or chain is thus protected from contamination by soil. A cable has the capacity to apply tension to a number of such soil anchors at once using a single cable winch as an actuator. They can also be placed with precision similar to the weight method described earlier.

Additionally, a sequence of anchoring systems like cables or screws for applying force have the advantage of "sewing" the ground together as there is an upward force applied from the anchoring auger and a downward force from the superterranean tightening mechanism.

For example, a single 3,000 kg cable winch can create 6,000 kg compressive force on each anchored cable because there would be 3,000 kg on each of two cables passing to the subterranean anchor. If the same cable passed through 20 cable anchors in a line stretching over a 100 m, it would create 1,176 kN force or the equivalent of parking 5 fully loaded 24 metric ton trucks in a line at the push of a button. Other varieties of techniques could be used to compress screw type or hydraulic soil force application systems automatically.

A 1,1176 kN force applied along a 100 m line, arc, or circle will likely stop an aperture from opening and also close one along the line that is already open. This enables careful shaping of elevated spaces and the dynamic flow of solids within a filled or filling aperture.

These methods for applying force enable compressive forces to be applied in a line to "fence" in an area. In this way, the periphery of a subterranean aperture may be defined so as to effectuate control of the aperture's growth, shape and extent in a horizontal plane. Horizontal control of the aperture area enables an increase in aperture height when additional liquid is pumped into the aperture. The hydraulic pressure of the pumped fluid opens the aperture but within the constraints imposed by the anchors. Without limiting the horizontal growth of the aperture, additional liquid pumped into the aperture may increase areal extent without meaningfully increasing aperture height.

In one arrangement, two small augers can be driven in the ground on either side in a horizontal plane of an anchoring plate with a threaded rod above it. Connecting these and then tightening a bolt downward against the anchoring plate causes a downward force on the plate. This increases pressure on the volume of soil underneath the plate which force is translated to an upward tension on the two horizontally adjacent augers in the soil. This particular method does not involve perforating the soil directly in the area where the downward force is applied but instead perforating the soil some distance to either side horizontally of the compressive force application.

FIG. 10 (A) illustrates in more detail a compressive soil anchor and 10(B) shows a soil anchor with a slurry injection discharge at the upper end of the auger anchor that enables rotation to clear plugs which may form when injecting biomass materials. The placement of the subterranean discharge port normal to the axis of the anchoring device assists in reduction of plugging and enables higher fluid velocity in a selected direction. The addition of a liquid pressure jet operating at 7-38 MPa assists in pushing the injected slurry forward if applied such that the jet impinges on the fluid after the solids have begun moving outward from the axis of the well and into the aperture. The jet may be used to clear plugged material and assist cleaning along with the rotating normally oriented discharge port mentioned earlier.

Figure 11:
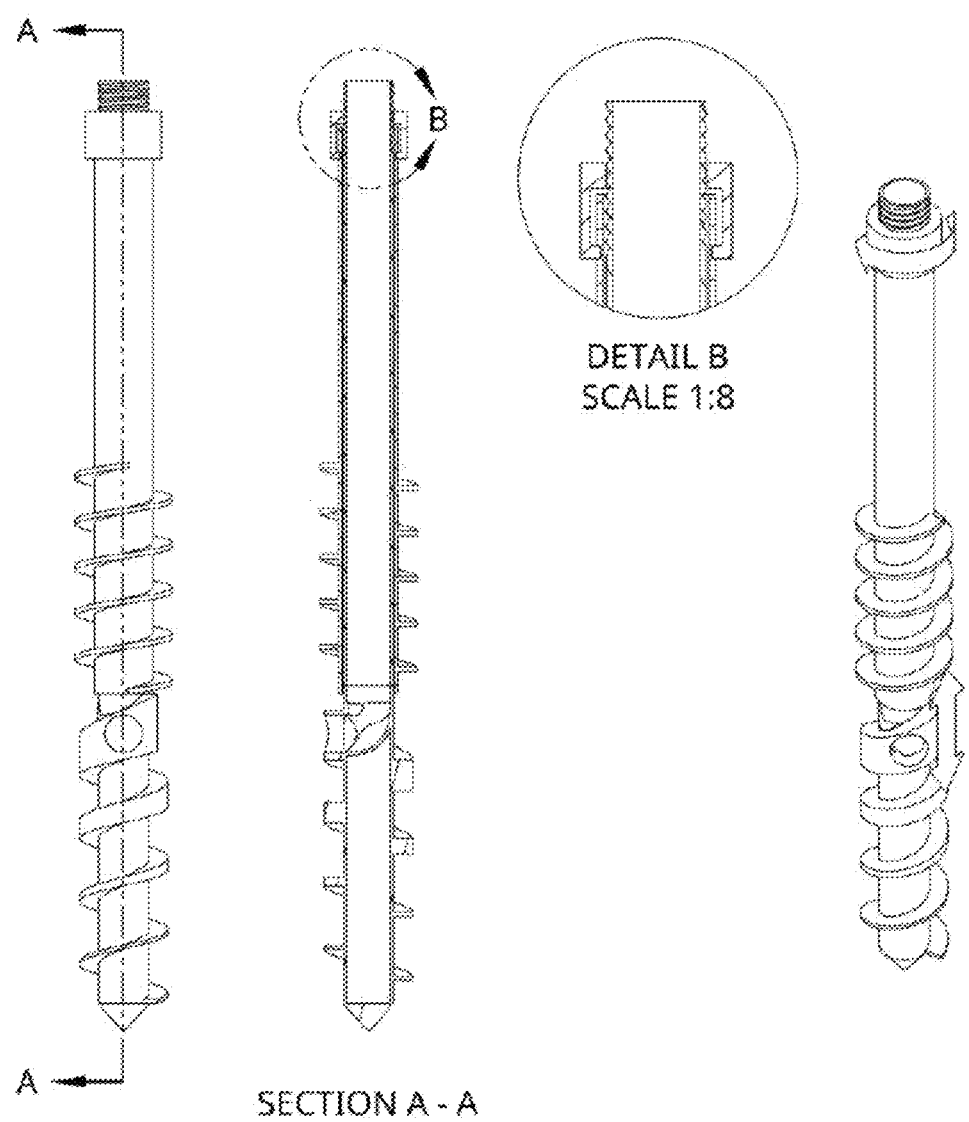
FIG. 11 illustrates a soil anchor that can apply either compression or tension to an area of soil intermediate between two anchor sections

FIG. 11 illustrates a soil anchor that does not employ a surface mounted footing to locate the upper reaction force but instead a second concentric auger soil anchor which may be located at any distance between the soil surface and the lower soil anchor by a separate rotary placement operation. In this way, the location of application of the reaction force may be altered in the vertical dimension. Both a compressive force and an opening or tensile force may be created between the upper and lower soil anchors by employing any of a variety of methods to create differential movement of the lower and upper soil anchors.

A second soil anchor such as an auger which can be placed a precise distance above a lower anchor enables application of compressive and tensile forces to alter the tendency of apertures to either open or close. Tensile forces encourage opening and compressive forces encourage closing or reduce the tendency to open. At one moment an area of subsoil can be in compression and moments later after adjustments are made to the mechanism, it may be in tension or the level of compression may be dramatically reduced relative to surrounding soil.

Dynamic aperture shaping is thus enabled as well as direct movement of aperture fluids from one area to another area without pumping fluid in or out of the aperture at the surface.

The dynamic opening and closing of one or many locations using an array of soil anchor devices such as those illustrated in FIG. 10 or 11 create opportunities to both control where and to what height apertures open and when and where fluid will be flowing within an aperture. Flow may be driven by pumping fluid in from the surface or pumping fluid in at one surface location and allowing or pumping it out a second or at multiple surface locations.

Removal of fluid is accomplished while maintaining back-pressure to support the aperture height. This can be done using a reversible pump such as a progressive cavity or a peristaltic pump whose rate is adjusted to maintain adequate back pressure or by a hydrocyclone device which increases back-pressure intrinsically as flow rate increase. An additional way for this to occur is to discharge fluid from within the aperture out of exits whose altitude above the ground may periodically be adjusted but which will intrinsically provide back pressure to the exiting fluid flow based on that discharge altitude. Each of the methods just described for metering exit flow enables passage of solids including those of up to 10 mm or more in a dimension.

Without surface fluid, movement to or from the aperture fluid may be transferred around the aperture by sequential compression of areas of the aperture. This is conceptually similar to squeezing a tube of toothpaste to move the toothpaste around inside the tube. Without surface fluid, movement to or from the aperture fluid may be transferred around the aperture by sequential compression of areas of the aperture. This is conceptually similar to squeezing a tube of toothpaste to move the toothpaste around inside the tube.

Figure 12:
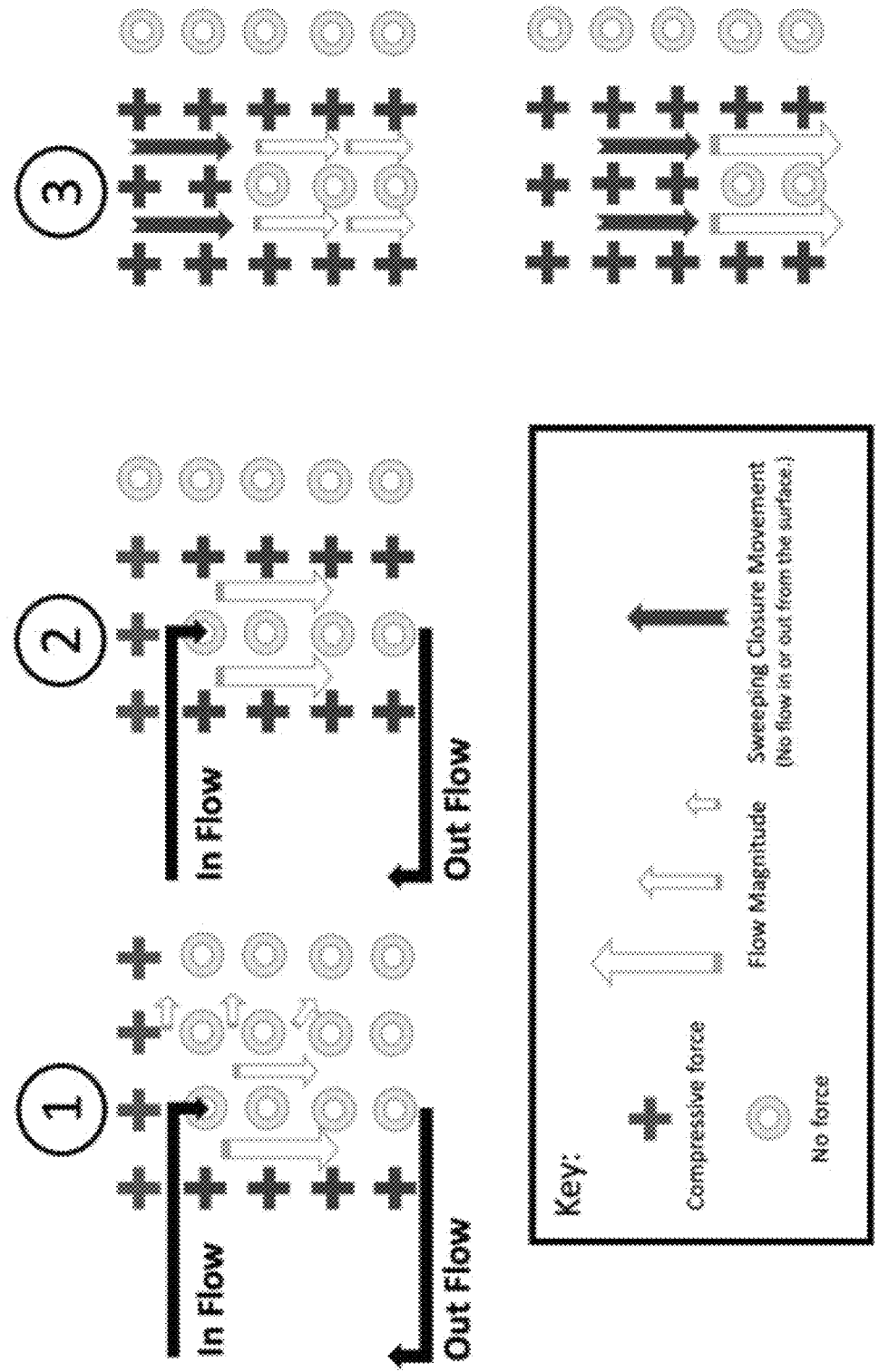
FIG. 12 illustrates how an array of soil anchoring devices may be applied in combination to alter the way in which a subterranean aperture is shaped, filled and compressed to facilitate escape of supernatant fluid.

The use of anchoring mechanisms to induce fluid flow is illustrated in FIG. 12. In column 1 of FIG. 12 an aperture is bounded on two sides by compressive anchors that restrict flow but still allow some light flow to the right. Column 2 illustrates the impact of a third bounding side which narrows and strengthens flow downward. The anchors on the three bounding sides preclude the fluid flow in these three direction and constrain the aperture as depicted in column 2. In column 3 the external flow to the aperture is stopped and a sweeping closure movement is induced by applying compression at first one and then sequentially a second location moving downward. This drives liquid flow from within the aperture space and may help to both drain and level the intra-aperture solids toward the unbounded lower edge. Column 1 would have a longer solid settling time than column 2 because a larger area of the aperture is experiencing flow. The higher rate in column 2 might, for example, lead to an unacceptably high proportion of the dense solids exiting the aperture without deposition.

If the fluid inside the aperture is a slurry, the solids may move with the induced flow. If the solids have settled, the supernatant fluid may move in this way so as to ease its removal or recycling to transport more solids to the aperture.

Removal of supernatant fluid from the aperture enables its recovery and reuse. This recovery is accomplished by direct addition to the injection pump sump. The recovery of valuable viscosifying agents such as guar gum, sodium bentonite and cellulose pulp is also accomplished in this way.

The complete leak-off of extra fluid from the subterranean aperture will require about 1 week. Thus it is best to first measure the elevation achieved by injection at least one week after injection is ceased. The minimum elevation achieved with solids 50% of which do not pass a 5 mm square screen opening will be about twice the median 5 mm size or about 10 mm.

It is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method, and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for altering a characteristic of the ground comprising:
    placing one or more anchoring devices in the ground;
    adjusting the one or more anchoring devices to alter at least one force experienced by a portion of the ground;
    transporting an aqueous fluid under a surface of the ground into an aperture created by the hydraulic pressure of the fluid within the ground, the aperture's shape is constrained by the forces created by the one or more anchoring devices;
    a lignocellulosic material suspended in an aqueous fluid is transported from the surface of the ground into the subterranean aperture, and
    the lignocellulosic material is accumulated in a subterranean space defined by the aperture; and
    allowing a portion of aqueous fluid to exit the vicinity of the accumulated lignocellulosic material.

2. The method of claim 1 further comprising the step of:
    opening a subterranean aperture with the aid of anchoring devices anchored on both sides of the portion of soil space to be created by moving the anchoring devices away from each other to push the portion of soil space open.

3. The method of claim 1 further comprising the step of:
    incorporating Sodium or Calcium Bentonite clay at a concentration of 1-12% by weight of the aqueous fluid transported to the subterranean aperture.

4. The method of claim 1 further comprising the step of:
    using one or more anchoring devices to preclude the subterranean aperture opening in a soil location by exerting forces between a first portion of the soil and a second portion of the soil.

5. The method of claim 1 further comprising the step of:
    using one or more anchoring devices to partially close the subterranean aperture in a soil location by exerting forces between a first portion of soil and a second portion of soil.

6. The method of claim 1 further comprising the step of:
    using one or more anchor devices to partially close the subterranean aperture in a soil location by exerting forces between a first portion of soil and a second portion of soil to induce fluid flow within a partially fluid-filled space within the aperture.

7. The method of claim 1 further comprising the step of:
    using a plurality of anchoring devices which exert force on a soil location to bound a subterranean aperture such that fluid may expand an aperture on one side of the bound while the opposing side of the bound remains substantially closed.

* * * * *